United States Patent
Ahn et al.

(10) Patent No.: US 10,491,355 B2
(45) Date of Patent: Nov. 26, 2019

(54) WIRELESS COMMUNICATION METHOD USING TRIGGER INFORMATION, AND WIRELESS COMMUNICATION TERMINAL USING SAME

(71) Applicants: WILUS INSTITUTE OF STANDARDS AND TECHNOLOGY INC., Gyeonggi-do (KR); SK TELECOM CO., LTD., Seoul (KR)

(72) Inventors: Woojin Ahn, Gyeonggi-do (KR); Juhyung Son, Gyeonggi-do (KR); Geonjung Ko, Gyeonggi-do (KR); Jinsam Kwak, Gyeonggi-do (KR)

(73) Assignees: WILUS INSTITUTE OF STANDARDS AND TECHNOLOGY INC., Gyeonggi-do (KR); SK TELECOM CO., LTD., Seoul (KR)

( * ) Notice: Subject to any disclaimer, the term of this patent is extended or adjusted under 35 U.S.C. 154(b) by 0 days.

(21) Appl. No.: 16/233,078

(22) Filed: Dec. 26, 2018

(65) Prior Publication Data
US 2019/0132107 A1 May 2, 2019

Related U.S. Application Data

(63) Continuation of application No. PCT/KR2017/007266, filed on Jul. 6, 2017.

(30) Foreign Application Priority Data

| Sep. 13, 2016 | (KR) | 10-2016-0117898 |
| Apr. 13, 2017 | (KR) | 10-2017-0048145 |
| Jul. 6, 2017 | (KR) | 10-2016-0085764 |

(51) Int. Cl.
| H04L 5/00 | (2006.01) |
| H04W 74/00 | (2009.01) |
| H04W 74/08 | (2009.01) |
| H04W 84/12 | (2009.01) |

(52) U.S. Cl.
CPC .......... *H04L 5/0055* (2013.01); *H04L 5/0044* (2013.01); *H04L 5/0058* (2013.01);
(Continued)

(58) Field of Classification Search
None
See application file for complete search history.

(56) References Cited

U.S. PATENT DOCUMENTS

| 2015/0124689 A1 | 5/2015 | Merlin et al. |
| 2015/0124690 A1* | 5/2015 | Merlin .......... H04L 5/0055 370/312 |

(Continued)

FOREIGN PATENT DOCUMENTS

| KR | 10-2007-0020033 | 2/2007 |
| WO | 2011/097141 | 8/2011 |

(Continued)

OTHER PUBLICATIONS

International Search Report for PCT/KR2017/007266 dated Nov. 8, 2017 and its English translation from WIPO (now published as WO 2018/009012).

(Continued)

*Primary Examiner* — Candal Elpenord
(74) *Attorney, Agent, or Firm* — Ladas & Parry, LLP

(57) ABSTRACT

Provided is a wireless communication terminal that communicates wirelessly. The wireless communication terminal includes: a transceiver; and a processor. The processor receiving trigger information from a base wireless communication terminal using the transceiver, and transmits an Aggregate-MAC Protocol Data Unit (A-MPDU) to the base wireless communication terminal based on the trigger information.

15 Claims, 22 Drawing Sheets

(52) U.S. Cl.
CPC ........... *H04W 74/00* (2013.01); *H04W 74/08* (2013.01); *H04W 84/12* (2013.01)

(56) References Cited

U.S. PATENT DOCUMENTS

| | | | |
|---|---|---|---|
| 2016/0080115 A1* | 3/2016 | Josiam | H04L 5/0094 |
| | | | 370/329 |
| 2017/0150493 A1 | 5/2017 | Seok | |
| 2017/0257196 A1* | 9/2017 | Ghosh | H04L 1/1854 |
| 2017/0272138 A1* | 9/2017 | Chun | H04L 29/08 |
| 2017/0289911 A1* | 10/2017 | Kim | H04W 28/06 |
| 2017/0303280 A1* | 10/2017 | Chun | H04L 1/1614 |
| 2017/0310446 A1* | 10/2017 | Asterjadhi | H04W 28/065 |
| 2018/0254861 A1 | 9/2018 | Cherian et al. | |

FOREIGN PATENT DOCUMENTS

| | | |
|---|---|---|
| WO | 2016/043538 | 3/2016 |
| WO | 2016/085311 | 6/2016 |
| WO | 2016/105128 | 6/2016 |
| WO | 2018/009012 | 1/2018 |

OTHER PUBLICATIONS

Written Opinion of the International Searching Authority for PCT/KR2017/007266 dated Nov. 8, 2017 and its English translation by Google Translate (now published as WO 2018/009012).
Office Action dated Sep. 16, 2019 for U.S. Patent Application No. 16/449,132.

* cited by examiner

WIRELESS COMMUNICATION METHOD USING TRIGGER INFORMATION, AND WIRELESS COMMUNICATION TERMINAL USING SAME

CROSS-REFERENCE TO RELATED APPLICATIONS

This application is a continuation of International Patent Application No. PCT/KR2017/007266 filed on Jul. 6, 2017, which claims the priority to Korean Patent Application No. 10-2016-0085764 filed in the Korean Intellectual Property Office on Jul. 6, 2016, Korean Patent Application No. 10-2016-0117898 filed in the Korean Intellectual Property Office on Sep. 13, 2016, and Korean Patent Application No. 10-2017-0048145 filed in the Korean Intellectual Property Office on Apr. 13, 2017, the entire contents of which are incorporated herein by reference.

TECHNICAL FIELD

The present invention relates to a wireless communication method and a wireless communication terminal using trigger information.

BACKGROUND ART

In recent years, with supply expansion of mobile apparatuses, a wireless communication technology that can provide a rapid wireless Internet service to the mobile apparatuses has been significantly spotlighted. The wireless communication technology allows mobile apparatuses including a smart phone, a smart pad, a laptop computer, a portable multimedia player, an embedded apparatus, and the like to wirelessly access the Internet in home or a company or a specific service providing area.

One of most famous wireless communication technology is wireless LAN technology. Institute of Electrical and Electronics Engineers (IEEE) 802.11 has commercialized or developed various technological standards since an initial wireless LAN technology is supported using frequencies of 2.4 GHz. First, the IEEE 802.11b supports a communication speed of a maximum of 11 Mbps while using frequencies of a 2.4 GHz band. IEEE 802.11a which is commercialized after the IEEE 802.11b uses frequencies of not the 2.4 GHz band but a 5 GHz band to reduce an influence by interference as compared with the frequencies of the 2.4 GHz band which are significantly congested and improves the communication speed up to a maximum of 54 Mbps by using an Orthogonal Frequency Division Multiplexing (OFDM) technology. However, the IEEE 802.11a has a disadvantage in that a communication distance is shorter than the IEEE 802.11b. In addition, IEEE 802.11g uses the frequencies of the 2.4 GHz band similarly to the IEEE 802.11b to implement the communication speed of a maximum of 54 Mbps and satisfies backward compatibility to significantly come into the spotlight and further, is superior to the IEEE 802.11a in terms of the communication distance.

Moreover, as a technology standard established to overcome a limitation of the communication speed which is pointed out as a weak point in a wireless LAN, IEEE 802.11n has been provided. The IEEE 802.11n aims at increasing the speed and reliability of a network and extending an operating distance of a wireless network. In more detail, the IEEE 802.11n supports a high throughput (HT) in which a data processing speed is a maximum of 540 Mbps or more and further, is based on a multiple inputs and multiple outputs (MIMO) technology in which multiple antennas are used at both sides of a transmitting unit and a receiving unit in order to minimize a transmission error and optimize a data speed. Further, the standard can use a coding scheme that transmits multiple copies which overlap with each other in order to increase data reliability.

As the supply of the wireless LAN is activated and further, applications using the wireless LAN are diversified, the need for new wireless LAN systems for supporting a higher throughput (very high throughput (VHT)) than the data processing speed supported by the IEEE 802.11n has come into the spotlight. Among them, IEEE 802.11ac supports a wide bandwidth (80 to 160 MHz) in the 5 GHz frequencies. The IEEE 802.11ac standard is defined only in the 5 GHz band, but initial 11ac chipsets will support even operations in the 2.4 GHz band for the backward compatibility with the existing 2.4 GHz band products. Theoretically, according to the standard, wireless LAN speeds of multiple stations are enabled up to a minimum of 1 Gbps and a maximum single link speed is enabled up to a minimum of 500 Mbps. This is achieved by extending concepts of a wireless interface accepted by 802.11n, such as a wider wireless frequency bandwidth (a maximum of 160 MHz), more MIMO spatial streams (a maximum of 8), multi-user MIMO, and high-density modulation (a maximum of 256 QAM). Further, as a scheme that transmits data by using a 60 GHz band instead of the existing 2.4 GHz/5 GHz, IEEE 802.11ad has been provided. The IEEE 802.11ad is a transmission standard that provides a speed of a maximum of 7 Gbps by using a beamforming technology and is suitable for high bit rate moving picture streaming such as massive data or non-compression HD video. However, since it is difficult for the 60 GHz frequency band to pass through an obstacle, it is disadvantageous in that the 60 GHz frequency band can be used only among devices in a short-distance space.

Meanwhile, in recent years, as next-generation wireless communication technology standards after the 802.11ac and 802.11ad, discussion for providing a high-efficiency and high-performance wireless communication technology in a high-density environment is continuously performed. That is, in a next-generation wireless communication technology environment, communication having high frequency efficiency needs to be provided indoors/outdoors under the presence of high-density terminals and base terminals and various technologies for implementing the communication are required.

Especially, as the number of devices using a wireless communication technology increases, it is necessary to efficiently use a predetermined channel Therefore, required is a technology capable of efficiently using bandwidths by simultaneously transmitting data between a plurality of terminals and base terminals.

Disclosure

Technical Problem

An object of an embodiment of the present invention is to provide a wireless communication terminal using trigger information.

Technical Solution

According to an embodiment of the present invention a wireless communication terminal communicating wirelessly includes: a transceiver; and a processor, wherein the processor is configured to receive trigger information from a base wireless communication terminal using the transceiver, and transmit an Aggregate-MAC Protocol Data Unit (A-MPDU) to the base wireless communication terminal based on the trigger information.

The processor may be configured to determine whether to aggregate an MPDU requesting an immediate response to generate the A-MPDU based on the trigger information.

The trigger information may be a trigger frame and the trigger frame may include a signaling field indicating whether the wireless communication terminal is allowed to aggregate an MPDU requesting an immediate response and generate the A-MPDU. The processor may be configured to aggregate an MPDU requesting an immediate response to generate the A-MPDU based on the signaling field.

When the value of the signaling field is a predetermined value, the processor may be configured to generate the A-MPDU that does not include an MPDU requesting an immediate response. When the value of the signaling field is within a predetermined range, the signaling field may indicate the maximum number of TIDs that the A-MPDU is capable of having when the wireless terminal generates the A-MPDU, and the processor may be configured to generate the A-MPDU according to the maximum number of TIDs.

In addition, when the value of the signaling field is within a predetermined range, the processor may be configured to aggregate the action frame regardless of the maximum number of TIDs that the A-MPDU is capable of having to generate the A-MPDU.

The MPDU not requesting the immediate response may include a Quality of Service (QoS) Null frame not requesting an ACK for data transmission.

In addition, the MPDU not requesting the immediate response may include an Action No Ack frame not requesting an ACK for data transmission.

In addition, the MPDU requesting the immediate response may include an action frame.

At this time, when the value of the signaling field is within a predetermined range, the processor may be configured to aggregate the action frame regardless of the maximum number of TIDs that the A-MPDU is capable of having to generate the A-MPDU.

The MPDU not requesting the immediate response may include an Action No Ack frame not requesting an ACK for data transmission.

When the trigger information is included in the MAC header, the processor may be configured to aggregate any one of an ACK frame and a Block ACK (BA) frame, and an MPDU not requesting an immediate response without the MPDU requesting the immediate response to generate the A-MPDU.

The MPDU not requesting the immediate response may include at least one of a QoS Null frame not requesting an ACK for data transmission and an Action No Ack frame not requesting an ACK for data transmission.

According to an embodiment of the present invention, a base wireless communication terminal communicating wirelessly includes; a transceiver; and a processor, wherein the processor is configured to transmit trigger information to a plurality of wireless communication terminals using the transceiver, and receive an Aggregate-MAC Protocol Data Unit (A-MPDU) generated based on the trigger information from at least one of the plurality of wireless communication terminals.

The trigger information may be a trigger frame, and the trigger frame may include a first signaling field indicating information on a type of MPDU included in the A-MPDU, wherein when a wireless communication terminal corresponding to the first signaling field is not allowed to aggregate an MPDU requesting an immediate response and generate the A-MPDU, the processor may be configured to set the value of the first signaling field to a predetermined value.

When a wireless communication terminal corresponding to the first signaling field is allowed to aggregate an MPDU requesting an immediate response and generate the A-MPDU, the processor may be configured to set the value of the first signaling field according to the maximum number of TIDs that the A-MPDU is capable of having.

The maximum number of TIDs that the A-MPDU is capable of having may indicate the maximum number of TIDs requesting an immediate response that the A-MPDU is capable of having.

A Quality of Service (QoS) null frame not requesting an ACK for data transmission may not correspond to a TID requesting an immediate response.

The trigger frame may include a second signaling field indicating whether channel sensing is required when transmitting the trigger-based Physical Layer Data Unit (PPDU).

The processor may be configured to set the value of the first signaling field based on the value of the second signaling field.

When the second signaling field is set to indicate that channel sensing for the trigger-based PPDU transmission is not required, the processor may be configured to set the value of the first signaling field to the predetermined value.

The trigger frame may include a third signaling field indicating information on a length of the trigger-based PPDU, wherein the processor may be configured to set the value of the first signaling field based on the value of the third signaling field.

According to an embodiment of the present invention, an operation method a wireless communication terminal communicating wirelessly includes receiving trigger information from a base wireless communication terminal; and transmitting an Aggregate-MAC Protocol Data Unit (A-MPDU) to the base wireless communication terminal based on the trigger information.

Advantageous Effects

An embodiment of the present invention provides a wireless communication method using trigger information and a wireless communication terminal using the same.

MODE FOR CARRYING OUT THE INVENTION

Figure 1:
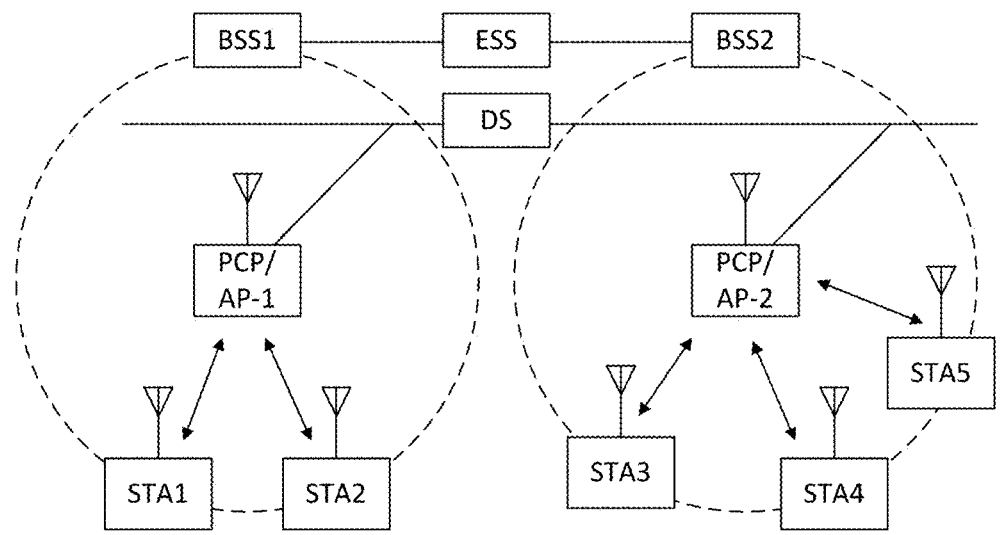
FIG. 1 shows a wireless LAN system according to an embodiment of the present invention.

Preferred embodiments of the present invention will be described below in more detail with reference to the accompanying drawings. The present invention may, however, be embodied in different forms and should not be constructed as limited to the embodiments set forth herein. Parts not relating to description are omitted in the drawings in order to clearly describe the present invention and like reference numerals refer to like elements throughout.

Furthermore, when it is described that one comprises (or includes or has) some elements, it should be understood that it may comprise (or include or has) only those elements, or it may comprise (or include or have) other elements as well as those elements if there is no specific limitation.

This application claims priority to and the benefit of Korean Patent Application Nos. 10-2016-0085764 (2016 Jul. 6), Nos. 10-2016-0117898 (2016 Sep. 13), and Nos. 10-2016-0048145 (2017 Apr. 13) filed in the Korean Intellectual Property Office and the embodiments and mentioned items described in the respective applications are included in the Detailed Description of the present application.

FIG. 1 is a diagram illustrating a wireless communication system according to an embodiment of the present invention. For convenience of description, an embodiment of the present invention is described through the wireless LAN system. The wireless LAN system includes one or more basic service sets (BSS) and the BSS represents a set of apparatuses which are successfully synchronized with each other to communicate with each other. In general, the BSS may be classified into an infrastructure BSS and an independent BSS (IBSS) and FIG. 1 illustrates the infrastructure BSS between them.

As illustrated in FIG. 1, the infrastructure BSS (BSS1 and BSS2) includes one or more stations STA1, STA2, STA3, STA4, and STA5, access points PCP/AP-1 and PCP/AP-2 which are stations providing a distribution service, and a distribution system (DS) connecting the multiple access points PCP/AP-1 and PCP/AP-2.

The station (STA) is a predetermined device including medium access control (MAC) following a regulation of an IEEE 802.11 standard and a physical layer interface for a wireless medium, and includes both a non-access point (non-AP) station and an access point (AP) in a broad sense. Further, in the present specification, a term 'terminal' may be used to refer to a concept including a wireless LAN communication device such as non-AP STA, or an AP, or both terms. A station for wireless communication includes a processor and a transceiver and according to the embodiment, may further include a user interface unit and a display unit. The processor may generate a frame to be transmitted through a wireless network or process a frame received through the wireless network and besides, perform various processing for controlling the station. In addition, the transceiver is functionally connected with the processor and transmits and receives frames through the wireless network for the station.

The access point (AP) is an entity that provides access to the distribution system (DS) via wireless medium for the station associated therewith. In the infrastructure BSS, communication among non-AP stations is, in principle, performed via the AP, but when a direct link is configured, direct communication is enabled even among the non-AP stations. Meanwhile, in the present invention, the AP is used as a concept including a personal BSS coordination point (PCP) and may include concepts including a centralized controller, a base station (BS), a node-B, a base transceiver system (BTS), and a site controller in a broad sense.

A plurality of infrastructure BSSs may be connected with each other through the distribution system (DS). In this case, a plurality of BSSs connected through the distribution system is referred to as an extended service set (ESS).

Figure 2:
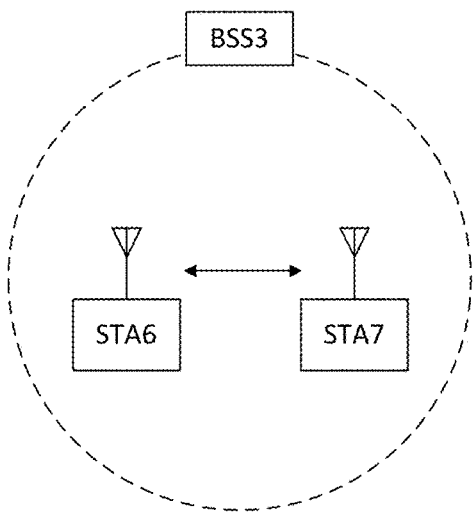
FIG. 2 shows a wireless LAN system according to another embodiment of the present invention.

FIG. 2 illustrates an independent BSS which is a wireless communication system according to another embodiment of the present invention. For convenience of description, another embodiment of the present invention is described through the wireless LAN system. In the embodiment of FIG. 2, duplicative description of parts, which are the same as or correspond to the embodiment of FIG. 1, will be omitted.

Since a BSS3 illustrated in FIG. 2 is the independent BSS and does not include the AP, all stations STA6 and STA7 are not connected with the AP. The independent BSS is not permitted to access the distribution system and forms a self-contained network. In the independent BSS, the respective stations STA6 and STA7 may be directly connected with each other.

Figure 3:
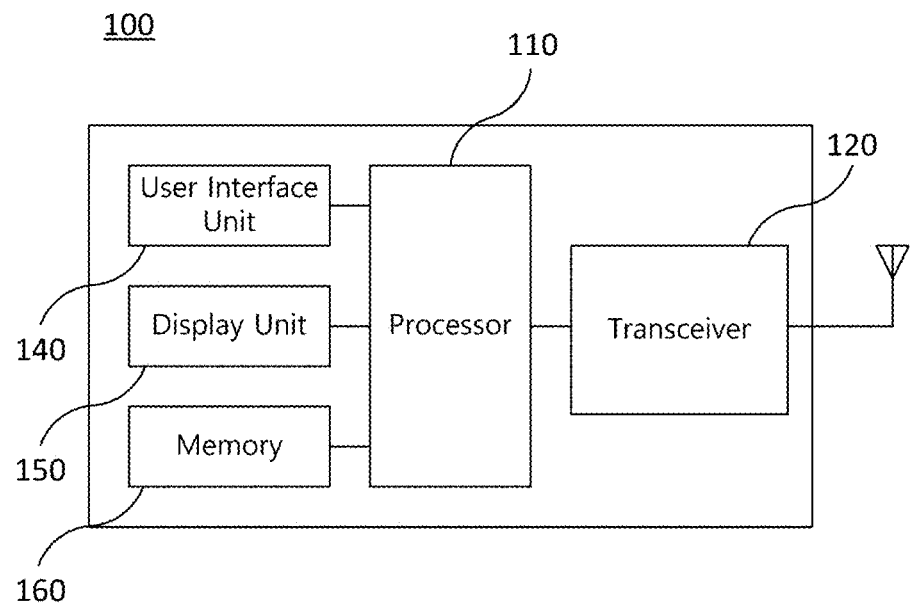
FIG. 3 shows a block diagram illustrating a configuration of a station according to an embodiment of the inventive concept.

FIG. 3 is a block diagram illustrating a configuration of a station 100 according to an embodiment of the present invention.

As illustrated in FIG. 3, the station 100 according to the embodiment of the present invention may include a processor 110, a transceiver 120, a user interface unit 140, a display unit 150, and a memory 160.

First, the transceiver 120 transmits and receives a wireless signal such as a wireless LAN physical layer frame, or the like and may be embedded in the station 100 or provided as an exterior. According to the embodiment, the transceiver 120 may include at least one transmit and receive module using different frequency bands. For example, the transceiver 120 may include transmit and receive modules having different frequency bands such as 2.4 GHz, 5 GHz, and 60 GHz. According to an embodiment, the station 100 may include a transmit and receive module using a frequency band of 6 GHz or more and a transmit and receive module using a frequency band of 6 GHz or less. The respective transmit and receive modules may perform wireless communication with the AP or an external station according to a wireless LAN standard of a frequency band supported by the corresponding transmit and receive module. The transceiver 120 may operate only one transmit and receive module at a time or simultaneously operate multiple transmit and receive modules together according to the performance and requirements of the station 100. When the station 100 includes a plurality of transmit and receive modules, each transmit and receive module may be implemented by independent elements or a plurality of modules may be integrated into one chip.

Next, the user interface unit 140 includes various types of input/output means provided in the station 100. That is, the user interface unit 140 may receive a user input by using various input means and the processor 110 may control the station 100 based on the received user input. Further, the user interface unit 140 may perform output based on a command of the processor 110 by using various output means.

Next, the display unit 150 outputs an image on a display screen. The display unit 150 may output various display objects such as contents executed by the processor 110 or a user interface based on a control command of the processor 110, and the like. Further, the memory 160 stores a control program used in the station 100 and various resulting data.

The control program may include an access program required for the station 100 to access the AP or the external station.

The processor 110 of the present invention may execute various commands or programs and process data in the station 100. Further, the processor 110 may control the respective units of the station 100 and control data transmission/reception among the units. According to the embodiment of the present invention, the processor 110 may execute the program for accessing the AP stored in the memory 160 and receive a communication configuration message transmitted by the AP. Further, the processor 110 may read information on a priority condition of the station 100 included in the communication configuration message and request the access to the AP based on the information on the priority condition of the station 100. The processor 110 of the present invention may represent a main control unit of the station 100 and according to the embodiment, the processor 110 may represent a control unit for individually controlling some component of the station 100, for example, the transceiver 120, and the like. The processor 110 may be a modulator and/or demodulator which modulates wireless signal transmitted to the transceiver 120 and demodulates wireless signal received from the transceiver 120. The processor 110 controls various operations of wireless signal transmission/reception of the station 100 according to the embodiment of the present invention. A detailed embodiment thereof will be described below.

The station 100 illustrated in FIG. 3 is a block diagram according to an embodiment of the present invention, where separate blocks are illustrated as logically distinguished elements of the device. Accordingly, the elements of the device may be mounted in a single chip or multiple chips depending on design of the device. For example, the processor 110 and the transceiver 120 may be implemented while being integrated into a single chip or implemented as a separate chip. Further, in the embodiment of the present invention, some components of the station 100, for example, the user interface unit 140 and the display unit 150 may be optionally provided in the station 100.

Figure 4:
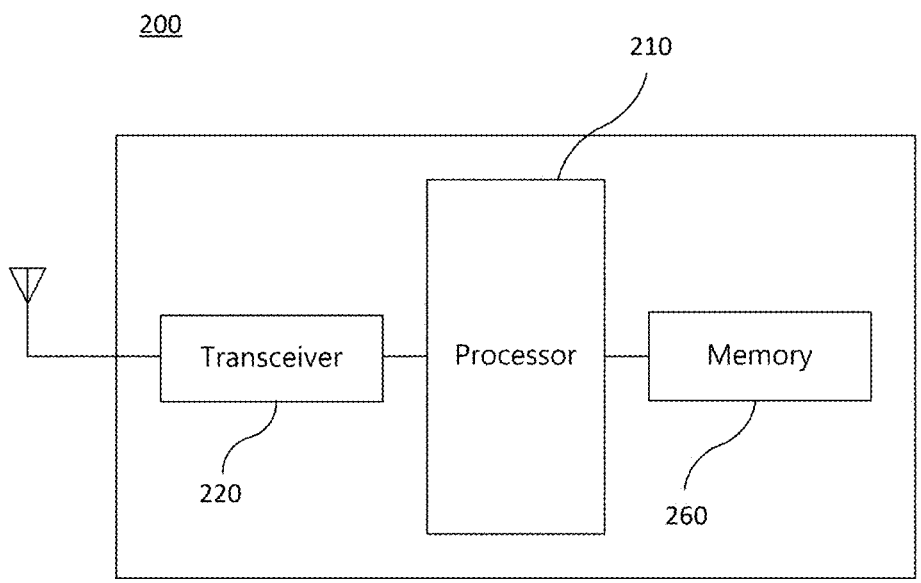
FIG. 4 shows a block diagram illustrating a configuration of an access point according to an embodiment of the present invention.

FIG. 4 is a block diagram illustrating a configuration of an AP 200 according to an embodiment of the present invention.

As illustrated in FIG. 4, the AP 200 according to the embodiment of the present invention may include a processor 210, a transceiver 220, and a memory 260. In FIG. 4, among the components of the AP 200, duplicative description of parts which are the same as or correspond to the components of the station 100 of FIG. 2 will be omitted.

Referring to FIG. 4, the AP 200 according to the present invention includes the transceiver 220 for operating the BSS in at least one frequency band. As described in the embodiment of FIG. 3, the transceiver 220 of the AP 200 may also include a plurality of transmit and receive modules using different frequency bands. That is, the AP 200 according to the embodiment of the present invention may include two or more transmit and receive modules among different frequency bands, for example, 2.4 GHz, 5 GHz, and 60 GHz together. Preferably, the AP 200 may include a transmit and receive module using a frequency band of 6 GHz or more and a transmit and receive module using a frequency band of 6 GHz or less. The respective transmit and receive modules may perform wireless communication with the station according to a wireless LAN standard of a frequency band supported by the corresponding transmit and receive module. The transceiver 220 may operate only one transmit and receive module at a time or simultaneously operate multiple transmit and receive modules together according to the performance and requirements of the AP 200.

Next, the memory 260 stores a control program used in the AP 200 and various resulting data. The control program may include an access program for managing the access of the station. Further, the processor 210 may control the respective units of the AP 200 and control data transmission/reception among the units. According to the embodiment of the present invention, the processor 210 may execute the program for accessing the station stored in the memory 260 and transmit communication configuration messages for one or more stations. In this case, the communication configuration messages may include information about access priority conditions of the respective stations. Further, the processor 210 performs an access configuration according to an access request of the station. The processor 210 may be a modulator and/or demodulator which modulates wireless signal transmitted to the transceiver 220 and demodulates wireless signal received from the transceiver 220. The processor 210 controls various operations such as radio signal transmission/reception of the AP 200 according to the embodiment of the present invention. A detailed embodiment thereof will be described below.

Figure 5:
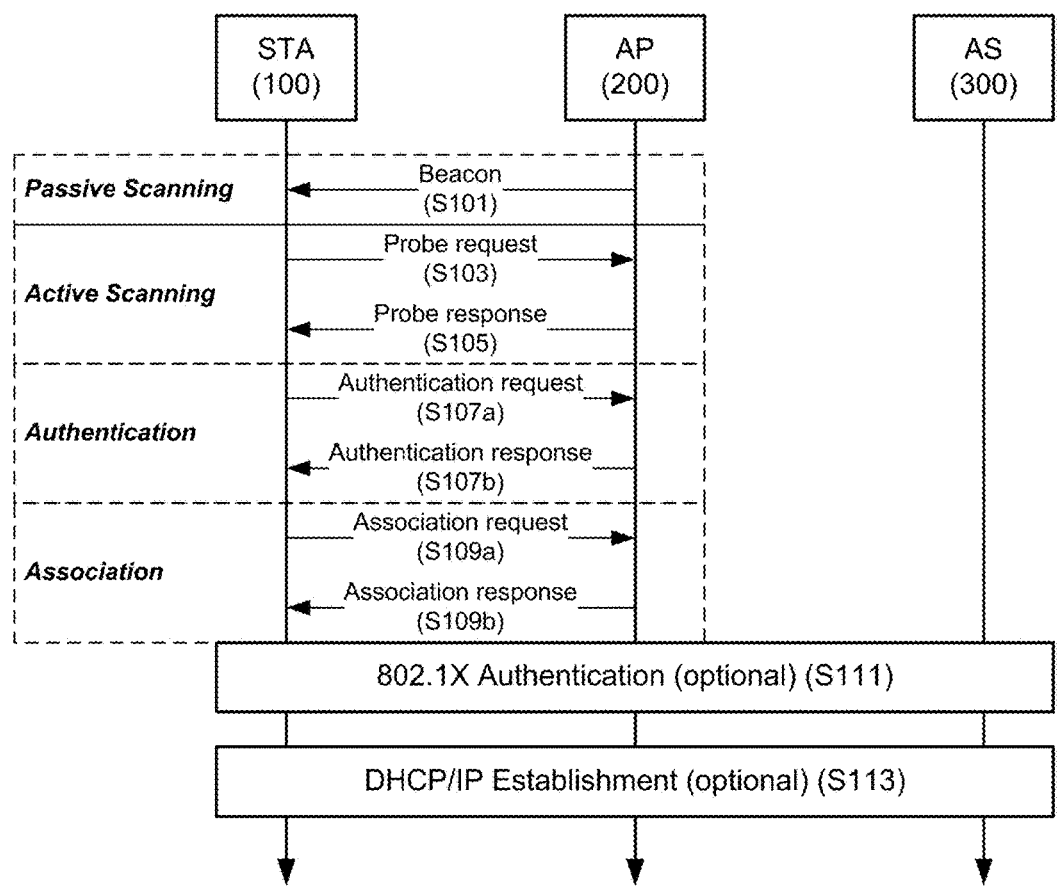
FIG. 5 shows a process that a station sets an access point and a link according to an embodiment of the present invention.

FIG. 5 is a diagram schematically illustrating a process in which a STA sets a link with an AP.

Referring to FIG. 5, the link between the STA 100 and the AP 200 is set through three steps of scanning, authentication, and association in a broad way. First, the scanning step is a step in which the STA 100 obtains access information of BSS operated by the AP 200. A method for performing the scanning includes a passive scanning method in which the AP 200 obtains information by using a beacon message (S101) which is periodically transmitted and an active scanning method in which the STA 100 transmits a probe request to the AP (S103) and obtains access information by receiving a probe response from the AP (S105).

The STA 100 that successfully receives wireless access information in the scanning step performs the authentication step by transmitting an authentication request (S107*a*) and receiving an authentication response from the AP 200 (S107*b*). After the authentication step is performed, the STA 100 performs the association step by transmitting an association request (S109*a*) and receiving an association response from the AP 200 (S109*b*).

Meanwhile, an 802.1X based authentication step (S111) and an IP address obtaining step (S113) through DHCP may be additionally performed. In FIG. 5, the authentication server 300 is a server that processes 802.1X based authentication with the STA 100 and may be present in physical association with the AP 200 or present as a separate server.

In a specific embodiment, the AP 200 may be a wireless communication terminal that allocates a communication medium resource and performs scheduling in an independent network, such as an ad-hoc network, which is not connected to an external distribution service. In addition, the AP 200 may be at least one of a base station, an eNB, and a transmission point TP. The AP 200 may also be referred to as a base wireless communication terminal.

An wireless communication terminal according to an embodiment of the present invention may use a data unit which is a data processing unit for a each layer to transmit and receive data. Specifically, the wireless communication terminal may generate a MAC Protocol Data Unit (MPDU) in a medium access control (MAC) layer and a physical protocol data unit (PPDU) in a physical layer. In addition, the wireless communication terminal receiving the data may receive the PPDU and obtain the MPDU from the PPDU.

Through this operation, the wireless communication terminal may increase the reliability and efficiency of data transmission. For convenience of explanation, a wireless communication terminal that transmits data is referred to as an originator, and a wireless communication terminal that receives data is referred to as a recipient. The originator may aggregate a plurality of MPDUs to generate an Aggregate-MAC Protocol Data Unit (A-MPDU) including the plurality of MPDUs. The originator may transmit the generated A-MPDU to the recipient. A specific operation of the wireless communication terminal related to the A-MPDU will be described with reference to FIGS. 6 to 24.

Figure 6:
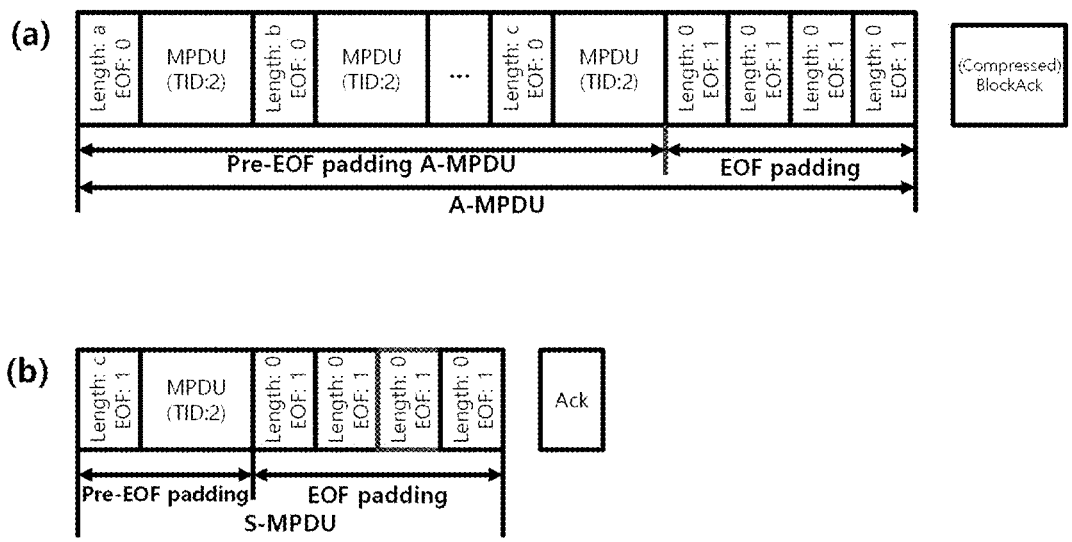
FIG. 6 shows a method of generating an Aggregate-MAC Protocol Data Unit (A-MPDU) by a wireless communication terminal according to an embodiment of the present invention.

FIG. 6 shows a method of generating an Aggregate-MAC Protocol Data Unit (A-MPDU) by a wireless communication terminal according to an embodiment of the present invention.

The wireless communication terminal may generate the A-MPDU as described above and transmit the A-MPDU to the recipient. Specifically, the wireless communication terminal may insert a plurality of MPDUs having the same TID to generate an A-MPDU. Through this, the wireless communication terminal may increase the transmission efficiency. Specifically, the wireless communication terminal may increase the transmission efficiency by reducing the number of channel access competition procedures required for data transmission. The wireless communication terminal may insert a delimiter indicating information on the MPDU and insert one or a plurality of MPDUs to generate an A-MPDU. The A-MPDU may be divided into Pre-EOF padding and EOF padding. At this time, the delimiter may include an EOF field indicating the end of the Pre-EOF padding portion included in the A-MPDU. Also, the EOF field may indicate that the MPDU corresponding to the delimiter requests an ACK that does not include the BA bitmap. Also, the delimiter may include an MPDU Length field indicating the length of the MPDU. Also, the delimiter may include a CRC field indicating a CRC value for error detection of the delimiter. In addition, the delimiter may include a Delimiter Signature field indicating a pattern for detecting the delimiter. The wireless communication terminal inserts a delimiter in which a value of the EOF field is 0 and a value of the MPDU Length field is non-zero into the A-MPDU and inserts the MPDU after the delimiter. The wireless communication terminal may insert one or a plurality of MPDUs and a plurality of delimiters indicating information on each of one or a plurality of MPDUs into the A-MPDU to generate Pre EOF Padding A-MPDU. At this time, the inserted MPDU may be a data MPDU corresponding to a TID agreed with BlockACK. The wireless communication terminal may insert EOF Padding after the Pre EOF Padding A-MPDU. At this time, the EOF padding may indicate one or a plurality of delimiters in which the value of the EOF field is 1 and the value of the MPDU Length field is 0. When the recipient detects a delimiter in which the value of the EOF field is 1 and the value of the MPDU Length field is 0, the recipient may determine that the A-MPDU transmission ends.

When the wireless communication terminal transmits a large amount of data, the wireless communication terminal may increase the transmission efficiency by using the A-MPDU. However, the recipient receiving the A-MPDU is required to transmit a Block ACK (BA) frame including the BA bitmap in response to the A-MPDU. Therefore, it may be inefficient for the wireless communication terminal to transmit one MPDU using the A-MPDU. Therefore, a recipient receiving a single-MPDU (S-MPDU) that is an A-MPDU including one MPDU may transmit an ACK frame instead of a BA frame to the originator in response to the A-MPDU. Specifically, regardless of the BA agreement for one MPDU, the recipient may transmit an ACK frame instead of a BA frame to the originator in response to the A-MPDU. In addition, the originator may set the value of the EOF field to 1 and the value of the MPDU Length field to a non-zero value in the delimiter located before the MPDU. Also, when the value of the EOF field of the delimiter included in the A-MPDU received by the recipient is 1 and the value of the MPDU Length field is 0, the recipient may determine that the received A-MPDU is the S-MPDU. In addition, the originator may insert EOF padding after the MPDU in the S-MPDU.

Figure 7:
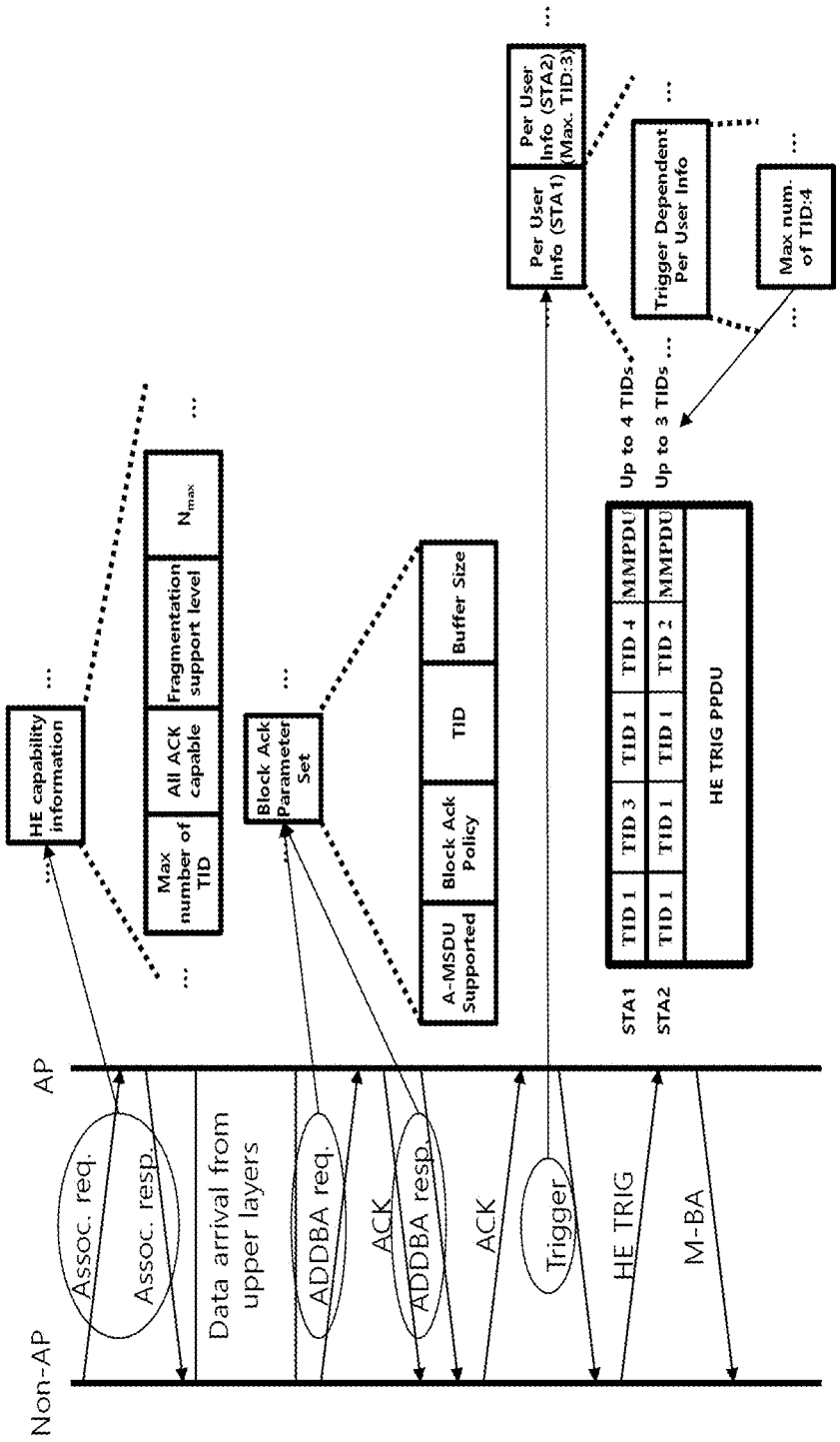
FIG. 7 shows a method for transmitting a Block Ack (BA) frame for an A-MPDU by a wireless communication terminal according to an embodiment of the present invention.

In the embodiment of FIG. 6(a), the wireless communication terminal aggregates a plurality of MPDUs with a TID of 2 and a plurality of delimiters (Pre EOF Padding) indicating information on each of the plurality of MPDUs to generate an A-MPDU. At this time, the MPDU is located after the delimiter indicating the information of the corresponding MPDU. In addition, the wireless communication terminal inserts EOF padding. In the embodiment of FIG. 6(b), the wireless communication terminal aggregates one MPDU with a TID of 2 and a delimiter (Pre EOF Padding) indicating information on a corresponding MPDU to generate an S-MPDU. At this time, the value of the EOF field of the delimiter is 1, and the value of the MPDU Length field is not 0. In addition, the wireless communication terminal inserts EOF padding into the S-MPDU. Referring to FIG. 7, an operation in which an originator transmits an A-MPDU and a recipient transmits a response to an A-MPDU will be described in detail.

FIG. 7 shows a method for transmitting a Block Ack (BA) frame for an A-MPDU by a wireless communication terminal according to an embodiment of the present invention.

As described above, the wireless communication terminal may generate an A-MPDU by combining only MPDUs having the same traffic identifier (TID). In another specific embodiment, the wireless communication terminal may combine a plurality of MPDUs having different TIDs to generate one A-MPDU. For convenience of explanation, an A-MPDU including a plurality of MPDUs corresponding to a plurality of different TIDs is referred to as a Multi-TID A-MPDU or an A-MPDU with Multiple TIDs. Through this, the wireless communication terminal may increase the transmission efficiency of the A-MPDU. In addition, a wireless communication terminal may transmit an A-MPDU with Multiple TIDs using a Physical Layer Protocol Data Unit (HE PPDU). At this time, the HE PPDU may be an HE Multi User (MU) PPDU. Also, the HE PPDU may be an HE trigger-based PPDU.

The wireless communication terminal may set parameters related to A-MPDU and BA frame transmission in a link setup procedure. The wireless communication terminal may set parameters related to transmission of an A-MPDU with Multiple TIDs in the link setup procedure. Specifically, the wireless communication terminal may transmit the maximum number of TIDs information indicating the maximum number of TIDs that the wireless communication terminal is capable of simultaneously receiving in the link setup procedure. At this time, the wireless communication terminal may transmit the maximum number of TIDs information using the HE capability information element indicating the capability of the terminal. This is because as the number of TIDs of an A-MPDU with Multiple TIDs increases, the high processing capability of the wireless communication terminal receiving the A-MPDU may be required. The maximum number of TIDs information may be the maximum number of TID field of the HE capability information element. The maximum number of TIDs information transmitted by the AP to the non-AP wireless communication terminal may indicate the maximum number of TIDs that the MPDU included in the UpLink (UL) A-MPDU transmitted by the corresponding non-AP wireless communication terminal is capable of having. In addition, the maximum number of TIDs information transmitted by the non-AP wireless communication terminal to the AP may indicate the maximum number of TIDs that the DownLink (DL) A-MPDU transmitted by the corresponding AP is capable of having. In the link setup procedure, the wireless communication terminal may transmit the maximum number of TIDs information using the management frame. At this time, the management frame may be at least one of a probe request frame, a probe response frame, an authentication request frame, an authentication response frame, an association request frame, an association response frame, and a beacon frame. Also, when the AP transmits the maximum number of TIDs information using the beacon frame, the maximum number of TIDs information may indicate the number of TIDs that the AP is capable of simultaneously receiving. Specifically, when an AP transmits the maximum number of TIDs information using a beacon frame, the maximum number of TIDs information may indicate the maximum number of TIDs that is allowed to be transmitted in the MU UL transmission, not the maximum number of TIDs that the MPDU included in the A-MPDU transmitted from any one wireless communication terminal to the AP is capable of having. This is because the AP transmits the beacon frame to the entire wireless communication terminal of the BSS operated by the AP. In another specific embodiment, the maximum number of TIDs information of the beacon frame may be used for other purposes. In another specific embodiment, the maximum number of TID field of the beacon frame may be a reserved field.

In the link setup procedure, the wireless communication terminal may receive All ACK from the recipient and transmit an All ACK capable indicator indicating whether the wireless communication terminal is capable of processing the All ACK. At this time, the All ACK is an ACK indicating that the recipient receives all the MPDUs included in an A-MPDU transmitted by one originator or the Multiple TID A-MPDUs transmitted by one originator. When an All ACK is transmitted, the originator may not know the information on the fragment transmitted from the All ACK. To process the All ACK, the originator must store information on the fragments transmitted by the originator. This is because the originator may not be able to store information on fragments transmitted by the originator according to the capability. Specifically, the wireless communication terminal may transmit an All ACK capable indicator indicating whether the All ACK can be processed using the HE capability information element.

The wireless communication terminal may fragment and transmit at least one of a MAC service data unit (MSDU), an Aggregate (A)-MSDU, and a management protocol data unit (MMPDU). For convenience of explanation, a portion of an MSDU, a portion of an A-MSDU, or a portion of an MMPDU, which are generated through fragmentation, is referred to as a fragment. In addition, a wireless communication terminal that transmits data is referred to as an originator, and a wireless communication terminal that receives data is referred to as a recipient.

Specifically, the wireless communication terminal may generate a plurality of fragments by fragmenting at least one of an MSDU, an A-MSDU, and an MMPDU. At this time, the wireless communication terminal may transmit the generated plurality of fragments to a plurality of MPDUs. In addition, the wireless communication terminal receiving a plurality of fragments may defragment a plurality of fragments to obtain at least one of one MSDU, one A-MSDU, and one MMPDU. At this time, the MPDU may be an S-MPDU or an A-MPDU.

The recipient needs sufficient buffer capacity and processing capacity to defragment multiple fragments. Specifically, the recipient is required to store all fragments until the recipient receives all the fragments of the MSDU corresponding to the same sequence number. Thus, when the recipient supports the capability to receive fragments, the originator may transmit the fragments to the recipient. Eventually, the originator is required to know the fragmentation level that the recipient supports. The wireless communication terminal may signal on the fragmentation level. Specifically, the wireless communication terminal transmits information on the fragmentation level of the fragments that the wireless communication terminal may receive in the link setup procedure with the AP, and receives information on the fragmentation level of the fragments that the AP may receive. Specifically, the wireless communication terminal may transmit information on the fragmentation level using the HE Capability information element. At this time, the HE Capability information element may indicate the capability of the wireless communication terminal. Further, the wireless communication terminal may transmit information on the fragmentation level using at least one of a probe request frame, a probe response frame, an authentication request frame, an authentication response frame, an association request frame, and an association response frame.

As described above, the HE capability information element may include a Max number of TID field, an All ACK capable indicator, and information (Fragmentation support level) indicating a fragmentation level supported by the wireless communication terminal.

Further, the wireless communication terminal may set BA parameters in the Add Block ACK (ADDBA) procedure. At this time, the BA parameter is a parameter used for BA frame transmission and BA frame reception. The wireless communication terminal may request an ACK in the form of a BA frame using an ADDBA request frame. Also, the wireless communication terminal may transmit a response to the ADDBA request frame using the ADDBA response frame. The ADDBA request frame and the ADDBA response frame may include a Block Ack Parameter Set element. At this time, the Block Ack Parameter Set element includes information on the BA parameter. In addition, the wireless communication terminal may set BA parameters for each TID. Specifically, the wireless communication terminal may negotiate the BA parameter setting for each TID. In a specific embodiment, the wireless communication terminal may specify a TID that is the subject of the BA parameter setting negotiation using the TID field included in the Block Ack Parameter Set element. The originator may request the BA parameter setting by transmitting an ADDBA request frame. The recipient may receive the ADDBA request frame and transmit the ADDBA response frame for the ADDBA request frame to determine the BA parameter setting. When the originator receives an ADDBA response frame and transmits an ACK frame for an ADDBA response frame, the originator and recipient may set the BA parameters.

The wireless communication terminal may transmit buffer size information indicating the number of MPDUs that may be stored until transmitting the BA frame after receiving the data in the ADDBA procedure. Specifically, the wireless communication terminal may transmit the buffer size information using the Block Ack Parameter Set element in the ADDBA procedure. The wireless communication terminal may set the length of the BA bitmap based on a range of values that the buffer size information is capable of having. Specifically, when the range of the value that the buffer size information is capable of having is between 1 and X, the wireless communication terminal may set the length of the BA bitmap to X bits. At this time, when the wireless communication terminal fails to receive information on the length of the BA bitmap, the wireless communication terminal may set the length of the BA bitmap to X bits.

When the AP performs DL transmission to the wireless communication terminal, the AP may transmit the A-MPDU based on the capability of the wireless communication terminal signaled in the link setup procedure and the BA parameter set in the ADDBA procedure. At this time, the wireless communication terminal may transmit a BA frame or a Multi-STA Block ACK (M-BA) frame to the AP based on the capability of the AP and the BA parameter set in the ADDBA procedure.

When the AP simultaneously receives A-MPDUs from a plurality of wireless communication terminals, it may be difficult to store a plurality of MPDUs received by the AP in a buffer and maintain a score board. At this time, the score board indicates information on the reception status of each of the MPDUs recorded by the AP. Therefore, the AP may use the trigger frame to indicate the maximum number of TIDs that each wireless communication terminal may have for the A-MPDU to transmit. Specifically, the AP may use the User Info field of the trigger frame to indicate the maximum TID to be transmitted by the wireless communication terminal corresponding to the User Info field. At this time, the wireless communication terminal receiving the trigger frame may set the number of TIDs that the A-MPDU is capable of having based on the trigger frame. Specifically, the wireless communication terminal receiving the trigger frame may set the number of TIDs of the MPDU included in the A-MPDU to transmit based on the maximum number of TIDs indicated by the trigger frame, and transmit the A-MPDU to the AP. For example, the wireless communication terminal receiving the trigger frame may set the number of TIDs of the MPDU included in the A-MPDU to transmit, which does not exceed the maximum number of TIDs indicated by the trigger frame, and transmit the A-MPDU to the AP.

Also, the wireless communication terminal may transmit an A-MPDU with Multiple TIDs in the SU transmission. Specifically, when the wireless communication terminal uses the HE MU PPDU in the Single User (SU) Uplink (UL) transmission, it may be restricted that the wireless communication terminal transmits the A-MPDU with Multiple TIDs. The wireless communication terminal may use a relatively wide transmission range in a narrow frequency band using the HE MU PPDU in SU UL transmission. At this time, when the wireless communication terminal is allowed to transmit the A-MPDU including the A-MPDU with multiple TIDs, a fairness problem may occur in terms of competition with other wireless communication terminals. Therefore, when the wireless communication terminal uses the HE MU PPDU in the SU UL transmission, it may be restricted that the wireless communication terminal transmits the A-MPDU with Multiple TIDs. Through FIGS. 8 to 15, a specific operation of an originator and a recipient related to a Multi-TID A-MPDU will be described.

As described above, when the recipient receives data with BA agreement, the recipient may maintain a score board that records the received data by each TID and AID. When a recipient receives a BAR frame requesting transmission of a BA frame, the recipient must transmit a BA frame based on the data reception record of the score board within a predetermined time. At this point, the predetermined time may be an SIFS. The recipient may implement the score board in one-chip memory form for efficient processing. In addition, the recipient may record a record for a plurality of BA sessions on one score board. Therefore, when the AP simultaneously receives A-MPDUs from a plurality of wireless communication terminals, it is difficult for the AP to maintain the score board as the number of the plurality of wireless communication terminals increases. Therefore, the AP may limit the number of TIDs of the MPDUs transmitted by the wireless communication terminals participating in the UL MU transmission.

The AP may use the trigger information to indicate the maximum number of TIDs that each wireless communication terminal is capable of having for the A-MPDU to transmit. At this time, the trigger information may be at least one of the UL MU response scheduling (UL MU RS) information included in the trigger frame and the MAC header. Through FIGS. 8 to 12, an operation of the AP to indicate the maximum number of TIDs that the A-MPDUs to be transmitted by each wireless communication terminal using the trigger frame may have will be described.

Figure 8:
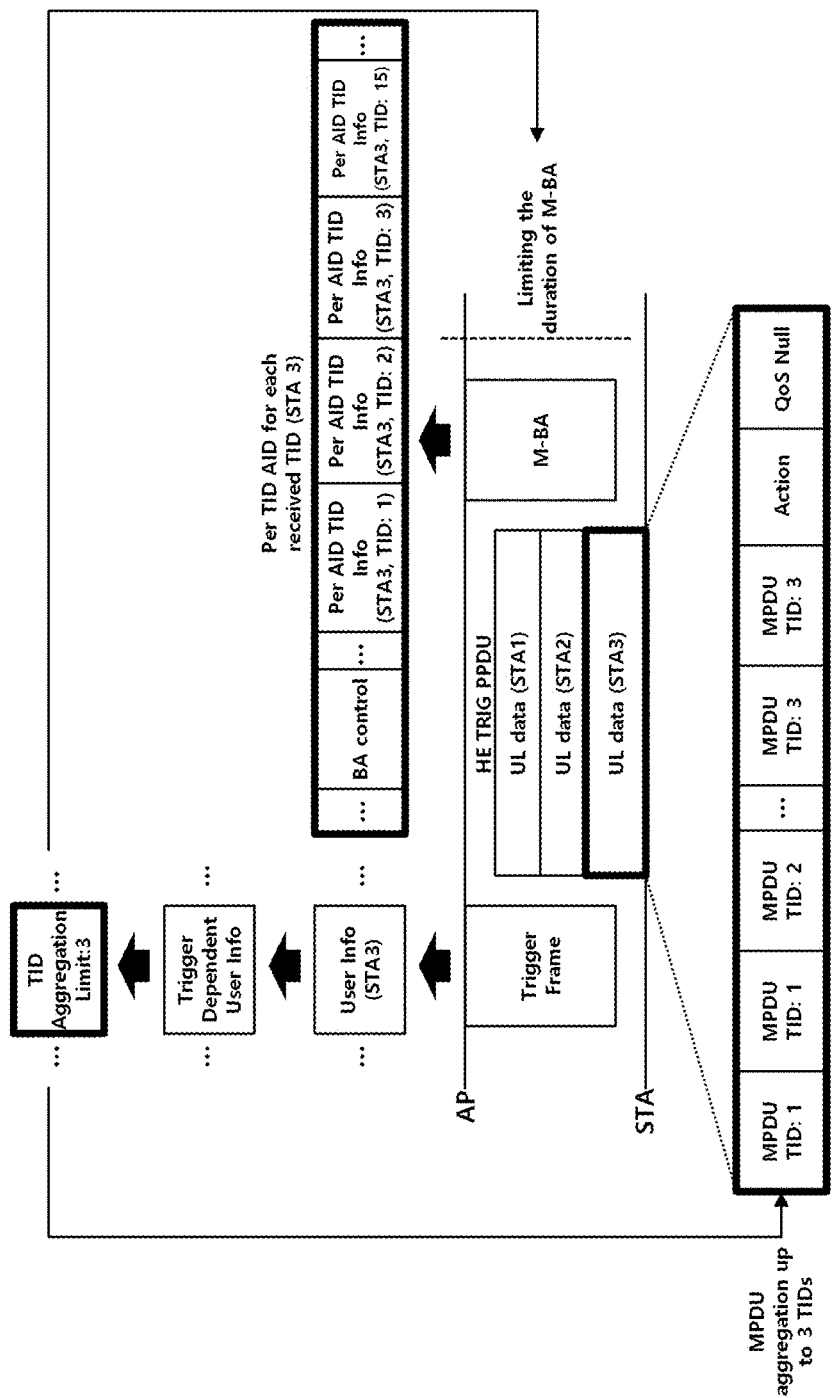
FIG. 8 illustrates an operation of a wireless communication terminal according to an embodiment of the present invention to transmit an A-MPDU based on maximum number of TIDs information.

FIG. 8 shows an operation of a wireless communication terminal according to an embodiment of the present invention to transmit an A-MPDU based on the maximum number of TIDs information.

The AP may use the trigger frame to indicate information on the type of an MPDU included in the A-MPDU to be transmitted to the AP by the wireless communication terminal. As described above, the AP may use the trigger frame to indicate the maximum number of TIDs that the A-MPDU that the wireless communication terminal transmits to the AP is capable of having. Specifically, the AP may use the User Info field of the trigger frame to indicate the maximum TID to be transmitted by the wireless communication terminal corresponding to the User Info field. In a specific embodiment, the AP may use the TID Aggregation Limit of the User Info field of the trigger frame to indicate the maximum TID to be transmitted by the wireless communication terminal corresponding to the User Info field. At this time, the wireless communication terminal receiving the trigger frame may set the number of TIDs that the A-MPDU is capable of having based on the trigger frame. Specifically, the wireless communication terminal receiving the trigger frame may set the number of TIDs of the MPDU included in the A-MPDU to transmit based on the maximum number of TIDs indicated by the trigger frame, and transmit the A-MPDU to the AP. For example, the wireless communication terminal receiving the trigger frame may set the number of TIDs of the MPDU included in the A-MPDU to transmit, which does not exceed the maximum number of TIDs indicated by the trigger frame, and transmit the A-MPDU to the AP. Through this, the AP may efficiently manage the scoreboard. In addition, BA bitmap lengths for each of a plurality of wireless communication terminals may be adjusted.

In a specific embodiment, the value of the TID Aggregation Limit field may indicate the maximum number of TIDs that the A-MPDU that the wireless communication terminal receiving the trigger frame transmits to the AP is capable of having. For example, when the TID Aggregation Limit field is a 3-bit field and has a value from 0 to 7, each of the values 0 to 7 may indicate that the maximum number of TIDs of the A-MPDU to be transmitted to the AP corresponds to any one of 1 to 8.

In another specific embodiment, the AP may use the trigger frame to indicate that the wireless communication terminal indicated in the trigger frame is not allowed to generate the A-MPDU to be transmitted to the AP by aggregating the MPDU having the TID. Specifically, the AP may set the TID Aggregation Limit to 0 to indicate that the wireless communication terminal indicated in the trigger frame is not allowed to generate the A-MPDU to be transmitted to the AP by aggregating the MPDU having the TID. However, when the A-MPDU includes an MPDU requesting an immediate response even when the MPDU does not have a TID, the size of the BA frame transmitted by the recipient in response to the A-MPDU may be increased. Also, the burden of managing the scoreboard of the recipient may be increased. At this time, an immediate response may indicate that the recipient transmits a response to the originator within a predetermined time period in the same Transmission Opportunity (TXOP). Specifically, the predetermined period may be a Short Inter-Frame Space (SIFS).

In another specific embodiment, the AP may use the trigger frame to indicate that the wireless communication terminal indicated by the trigger frame is not allowed to generate the A-MPDU to be transmitted to the AP by aggregating the MPDUs that request an immediate response. At this time, the MPDU requesting an immediate response may include an MPDU including Quality of Service (QoS) data having a TID. In addition, an MPDU requesting an immediate response may include a Management MPDU (MMPDU) requesting an immediate response. Specifically, an MPDU requesting an immediate response may include an action frame. The AP sets the value of the TID Aggregation Limit field of the User Info field of the trigger frame to 0 to indicate that the wireless communication terminal corresponding to the User Info field is not allowed to generate the A-MPDU to be transmitted to the AP by aggregating MPDUs that request an immediate response. When the TID Aggregation Limit field value indicates a value other than 0, it may indicate the maximum number of TIDs that the A-MPDU to be transmitted by the wireless communication terminal indicated by the trigger frame to the AP may have. Also, when the trigger frame indicates that the wireless communication terminal is not allowed to generate an A-MPDU to be transmitted to the AP by aggregating MPDUs that request an immediate response, the wireless communication terminal may generate an A-MPDU to be transmitted to the AP by aggregating MPDUs not requesting an immediate response. Specifically, when the TID Aggregation Limit field value of the User Info field corresponding to the wireless communication terminal of the trigger frame is 0, the wireless communication terminal may generate an A-MPDU to be transmitted to the AP by aggregating MPDUs not requesting an immediate response. In a specific embodiment, an MPDU not requesting an immediate response may include an MPDU including QoS data with the ACK Policy set to No Ack. When the ACK Policy is set to No Ack, the ACK Policy may represent that no ACK is requested for the corresponding frame. In addition, an MPDU not requesting an immediate response may include a QoS null frame. At this time, the QoS Null frame may be a QoS Null frame in which ACK Policy is set to No Ack. In addition, an MPDU not requesting an immediate response may include an action No Ack frame.

In another specific embodiment, the AP may use the trigger frame to indicate that the wireless communication terminal indicated by the trigger frame is allowed to aggregate MPDUs without the number of TIDs limitation to generate an A-MPDU, and transmit the generated A-MPDU to the AP. Specifically, the AP sets the value of the TID Aggregation Limit field of the User Info field of the trigger frame to 7 to indicate that the wireless communication terminal corresponding to the User Info Field is allowed to aggregate MPDUs without the number of TIDs limitation to generate an A-MPDU, and transmit the generated A-MPDU to the AP.

In the embodiment of FIG. 8, the AP sets the value of the TID Aggregation Limit field of the User Info field corresponding to the third station of the trigger frame to 3 to indicate that the maximum number of TIDs that the A-MPDU to be transmitted to the AP by the third station STA3 is 3. The third station STA3 determines the number of TIDs of the A-MPDU to be transmitted to the AP based on the value of the TID Aggregation Limit field of the User Info field corresponding to the third station of the trigger frame. Specifically, the third station STA3 determines the number of TIDs of the A-MPDU to be transmitted to the AP as 3 based on the value of the TID Aggregation Limit field of the User Info field corresponding to the third station of the trigger frame. The third station STA1 aggregates an MPDU having a TID of 1, an MPDU having a TID of 2, an MPDU having a TID of 3, an action frame, and a QoS null frame to generate an A-MPDU to be transmitted to the AP. The third station STA3 transmits the generated A-MPDU to the AP. The AP transmits an M-BA frame to a plurality of wireless communication terminals including the third station STA3 based on the A-MPDU received from the third station SAT3. Through this embodiment, the AP adjusts the duration of the M-BA frame. In the embodiment of FIG. 8, the third station STA3 treats MPDUs having no TID, such as a QoS Null frame and an action frame, as being not included in the number of TIDs indicated by the maximum number of TIDs. However, when there is no BA agreement for a specific TID, the response to the MPDU having the corresponding TID may not affect the M-BA frame. Also, as described above, even an MPDU that does not correspond to a specific TID may request an immediate response. Therefore, there is a need for a specific embodiment for comparing the number of TIDs and the maximum number of TIDs of the A-MPDU to be transmitted to the AP by the wireless communication terminal. This will be described in detail with reference to FIGS. 9 to 12.

Figure 9:
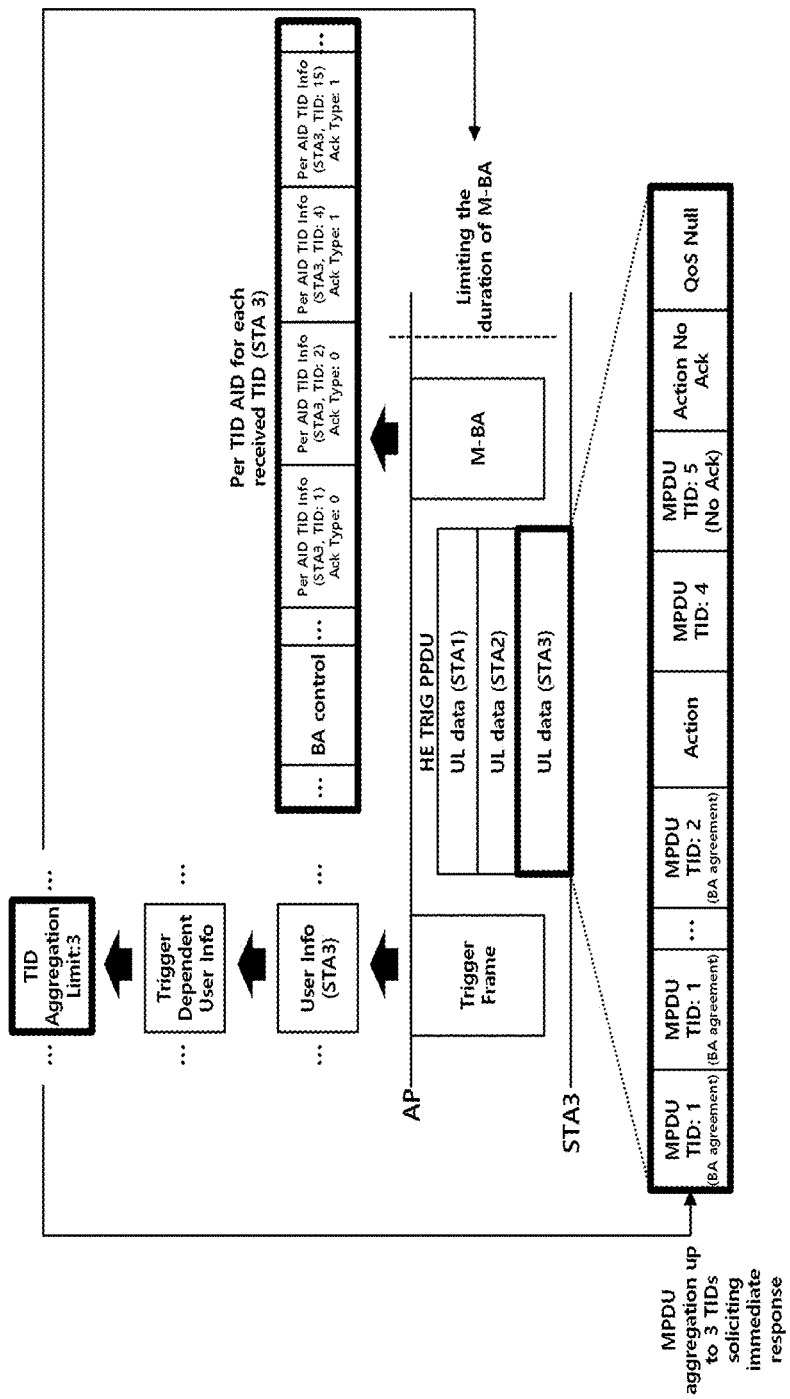
FIG. 9 shows an operation of a wireless communication terminal according to another embodiment of the present invention to transmit an A-MPDU based on maximum number of TIDs information.

FIG. 9 shows an operation of a wireless communication terminal according to another embodiment of the present invention to transmit an A-MPDU based on the maximum number of TIDs information.

The AP may use the trigger frame to indicate the maximum number of TIDs with the BA agreement that the A-MPDU to be transmitted by the wireless communication terminal is capable of having. The wireless communication terminal may calculate the number of TIDs of the A-MPDU based on the number of TIDs with the BA agreement. In the embodiments described above, when the wireless communication terminal compares the number of TIDs of the A-MPDU to be transmitted to the AP and the maximum number of TIDs, the wireless communication terminal may compare the number of TIDs with the BA agreement to the maximum number of TIDs. Specifically, when the wireless communication terminal compares the number of TIDs of the A-MPDU to be transmitted to the AP and the maximum number of TIDs, the wireless communication terminal may not calculate the TID with no BA agreement as the number of TIDs of the A-MPDU. That is because, since the recipient directly transmits the data corresponding to the TID with no BA agreement to the upper layer without storing the data corresponding to the TID in the buffer, data reception corresponding to the TID with no BA agreement may not affect the management of the score board. Also, this is because, when the wireless communication terminal calculates the TID with no BA agreement as the number of TIDs, the buffer management and the A-MPDU configuration may be restricted. Specifically when the value of the TID Aggregation Limit field is 1 to 6, the wireless communication terminal may generate an A-MPDU having the number of TIDs with BA agreement smaller than or equal to the value of the TID Aggregation Limit field, and may transmit the generated A-MPDU to the AP. At this time, the wireless communication terminal may add the MPDU corresponding to the TID with no BA agreement to the A-MPDU regardless of the value of the TID Aggregation Limit field. Further, the AP sets the value of the TID Aggregation Limit field of Per User Info of the trigger frame trigger frame to 0 to indicate that the wireless communication terminal corresponding to the Per User Info field is allowed to aggregate MPDUs not requesting an immediate response regardless of the TID with BA agreement to generate an A-MPDU and transmit the generated A-MPDU to the AP. Specifically, when the TID Aggregation Limit field value of the User Info field corresponding to the wireless communication terminal of the trigger frame is 0, the wireless communication terminal may generate an A-MPDU to be transmitted to the AP by aggregating MPDUs not requesting an immediate response.

In the embodiment of FIG. 9, the AP sets the value of the TID Aggregation Limit field of the User Info field corresponding to the third station of the trigger frame to 3 to indicate that the maximum number of TIDs with BA agreement that the A-MPDU to be transmitted to the AP by the third station STA3 is 3. The third station STA3 determines the number of TIDs with BA agreement of the A-MPDU to be transmitted to the AP based on the value of the TID Aggregation Limit field of the User Info field corresponding to the third station of the trigger frame. The third station STA3 determines that the A-MPDU to be transmitted to the AP has three TIDs with BA agreement based on the value of the TID Aggregation Limit field of the User Info field corresponding to the third station of the trigger frame. There is a BA agreement for TID 1, 2, and 4, and there is no BA agreement for TID 5. Accordingly, the third station STA1 aggregates an MPDU having a TID of 1, an MPDU having a TID of 2, an MPDU having a TID of 3, an MPDU having a TID of 5, an action No Ack frame, and a QoS null frame to generate an A-MPDU to be transmitted to the AP. The third station STA3 transmits the generated A-MPDU to the AP. The AP transmits an M-BA frame to a plurality of wireless communication terminals including the third station STA3 based on the A-MPDU received from the third station SAT3. Through this embodiment, the AP adjusts the duration of the M-BA frame.

Data corresponding to a TID with no BA agreement may also request an ACK frame transmission. At this time, the recipient may transmit the M-BA frame including the Per AID TID field that does not include the BA bitmap in response to the MPDU corresponding to the TID with no BA agreement. Therefore, even the MPDU corresponding to the TID with no BA agreement may affect the duration of the M-BA frame. Thus, the maximum number of TIDs that an A-MPDU may have may be calculated based on the number of TIDs requesting an immediate response and the number of frames without a TID requesting an immediate response. This will be described in more detail with reference to FIG. 10.

Figure 10:
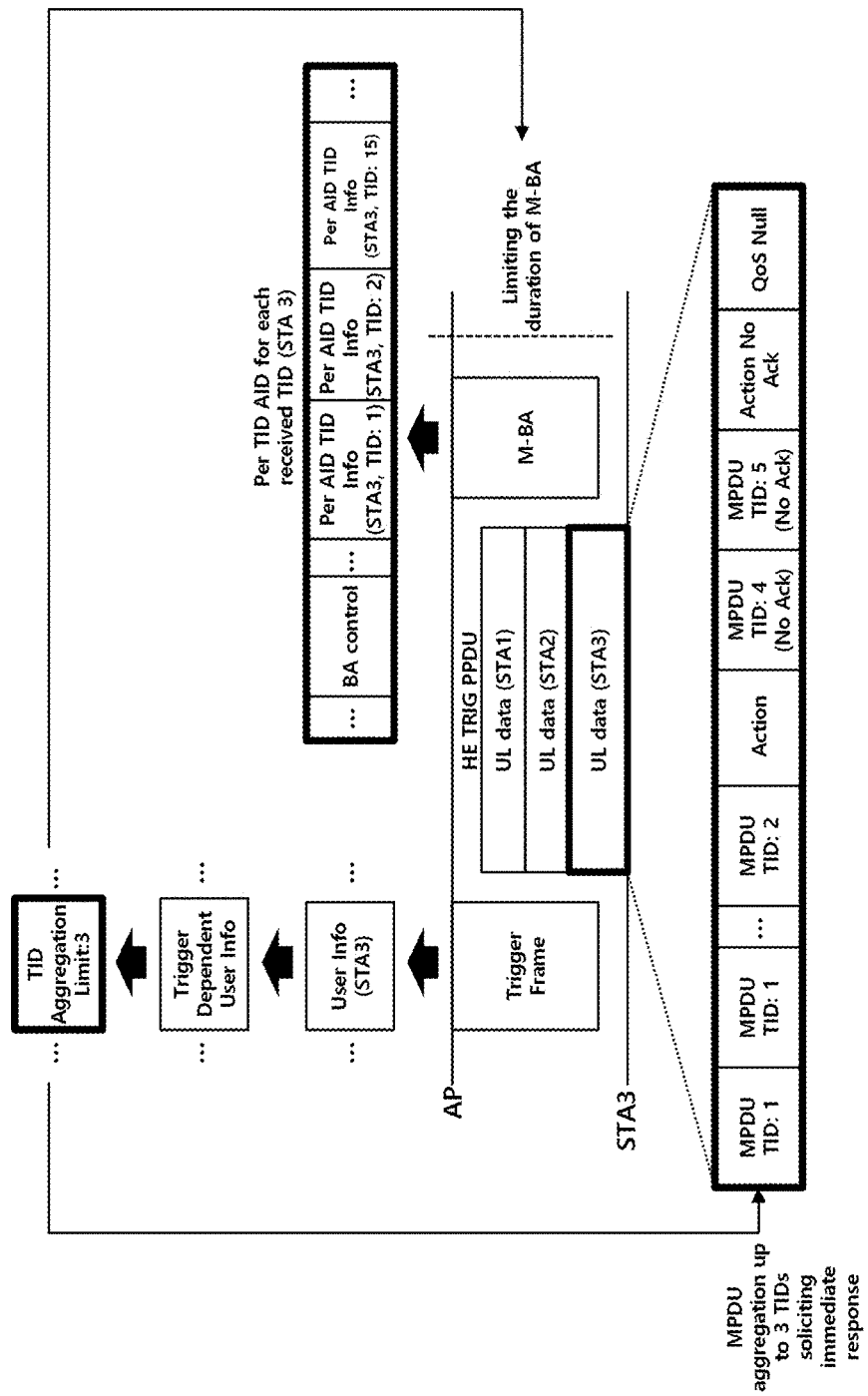
FIG. 10 shows an operation of a wireless communication terminal according to another embodiment of the present invention to transmit an A-MPDU based on maximum number of TIDs information.

FIG. 10 shows an operation of a wireless communication terminal according to another embodiment of the present invention to transmit an A-MPDU based on the maximum number of TIDs information.

The AP may use the trigger frame to limit the number of MPDUs requesting an immediate response that an A-MPDU to be transmitted by a wireless communication terminal may have. The AP may use the trigger frame to limit the number of MPDUs requesting an immediate response that an A-MPDU to be transmitted by a wireless communication terminal is capable of having. The wireless communication terminal may calculate the number of TIDs of the A-MPDU based on the number of TIDs requesting an immediate response. In the embodiments described above, when the wireless communication terminal compares the number of TIDs of the A-MPDU to be transmitted to the AP and the maximum number of TIDs, the wireless communication terminal may compare the number of TIDs requesting an immediate response of the A-MPDU to the maximum number of TIDs. When the wireless communication terminal compares the number of TIDs of the A-MPDU to be transmitted to the AP and the maximum number of TIDs, it is possible to calculate the number of TIDs of the A-MPDU without considering an MPDU not requesting an immediate response. Therefore, the wireless communication terminal may aggregate MPDUs corresponding to TIDs not requesting an immediate response regardless of the maximum number of TIDs. Also, the wireless communication terminal may aggregate frames without a TID not requesting an immediate response regardless of the maximum number of TIDs. Also, the number of TIDs requesting an immediate response may be the sum of the number of frames having no TID requesting an immediate response included in the A-MPDU and the number of TIDs requesting an immediate response included in the A-MPDU. The number of frames without a TID may indicate the type of frame without a TID. Also, an action frame in which the TID is 15 in the per AID TID field of the M-BA frame may be one of frames without a TID requesting an immediate response. The MPDU corresponding to the TID not requesting an immediate response may be the MPDU corresponding to the TID in which ACK policy is set to No Ack. Also, an MPDU corresponding to a TID not requesting an immediate response may be a QoS null frame. At this time, the ACK policy of the QoS Null frame may be No Ack. Also, a frame without a TID not requesting an immediate response may be an Action No Ack frame.

As described above, the AP sets the value of the TID Aggregation Limit field of Per User Info of the trigger frame trigger frame to 0 to indicate that the wireless communication terminal corresponding to the Per User Info field is allowed to aggregate MPDUs not requesting an immediate response regardless of the TID with BA agreement to generate an A-MPDU and transmit the generated A-MPDU to the AP. Specifically, when the TID Aggregation Limit field value of the User Info field corresponding to the wireless communication terminal of the trigger frame is 0, the wireless communication terminal may generate an A-MPDU to be transmitted to the AP by aggregating MPDUs not requesting an immediate response.

In the embodiment of FIG. 10, the AP sets the value of the TID Aggregation Limit field of the User Info field corresponding to the third station of the trigger frame to 3 to indicate that the maximum value of the sum of the number of TIDs that the A-MPDU to be transmitted to the AP by the third station STA3 may have and the number of frames without a TID requesting an immediate response included in the A-MPDU is 3. The third station STA3 determines the number of sums of the number of TIDs requesting an immediate response of the A-MPDU to be transmitted to the AP and the number of frames without a TID requesting an immediate response based on the value of the TID Aggregation Limit field of the User Info field corresponding to the third station of the trigger frame. The third station STA3 determines as 3 the sum of the number of TIDs requesting an immediate response of the A-MPDU to be transmitted to the AP and the number of frames without a TID requesting an immediate response based on the value of the TID Aggregation Limit field of the User Info field corresponding to the third station of the trigger frame. TIDs 1 and 2 request an immediate response, and TIDs 4 and 5 have the ACK policy set to No Ack. Also, the action frame requests an immediate response. Accordingly, the third station STA1 aggregates an MPDU having a TID of 1, an MPDU having a TID of 2, an MPDU having a TID of 4, an MPDU having a TID of 5, an action frame, an action No Ack frame, and a QoS null frame to generate an A-MPDU to be transmitted to the AP. The third station STA3 transmits the generated A-MPDU to the AP. The AP transmits an M-BA frame to a plurality of wireless communication terminals including the third station STA3 based on the A-MPDU received from the third station SAT3. Through this embodiment, the AP adjusts the duration of the M-BA frame.

Figure 11:
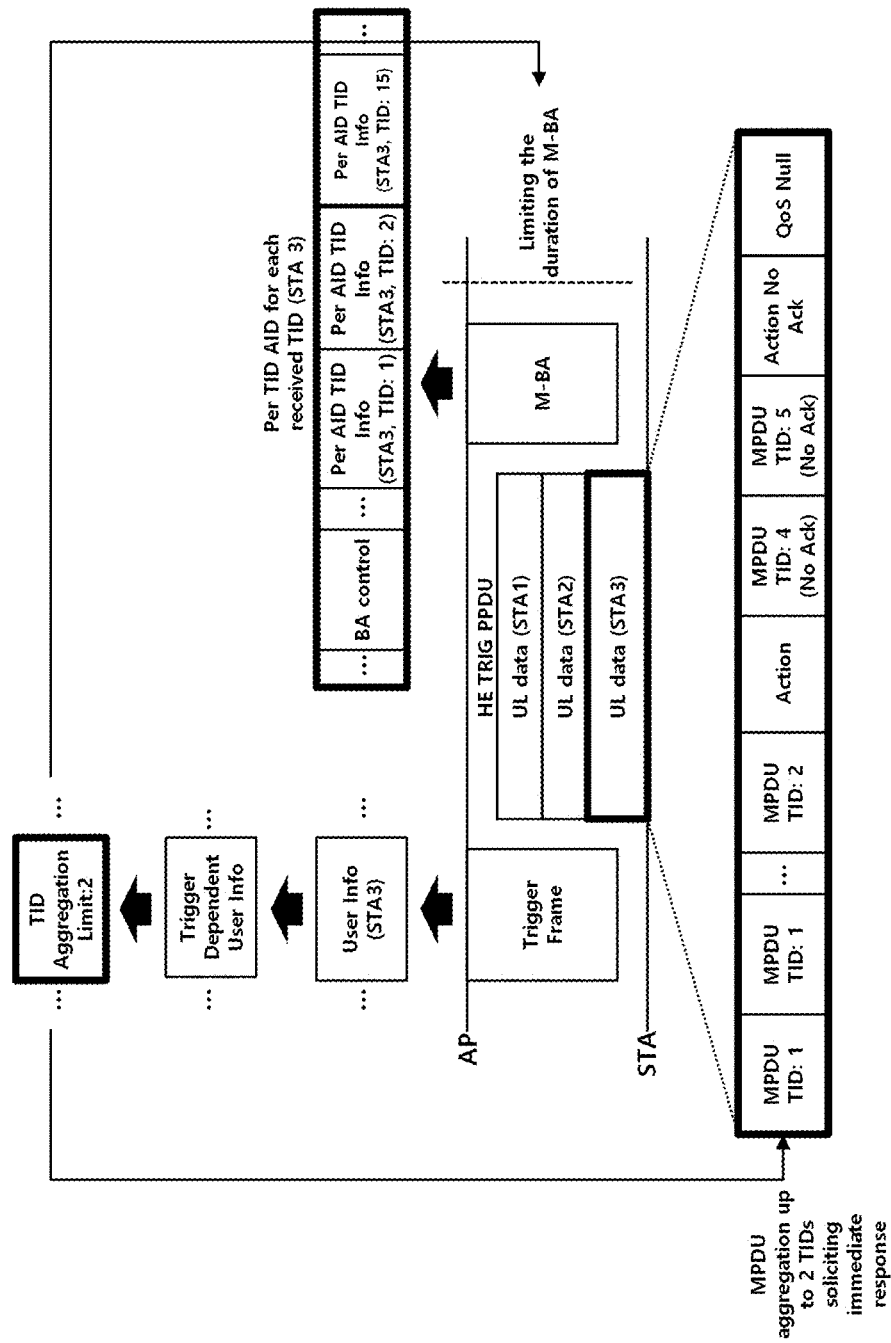
FIG. 11 shows an operation of a wireless communication terminal according to another embodiment of the present invention to transmit an A-MPDU based on maximum number of TIDs information.

FIG. 11 shows an operation of a wireless communication terminal according to another embodiment of the present invention to transmit an A-MPDU based on the maximum number of TIDs information.

The Multi-TID A-MPDU may not include a plurality of action frames. Accordingly, the Multi-TID A-MPDU may include only one action frame. Also, when the A-MPDU additionally includes an action frame, the length of the M-BA frame is increased by two octets. Therefore, the change in the M-BA duration due to the addition of the action frame to the A-MPDU is insignificant. Also, it may be seen that the action frame is more important than the QoS data frame.

When the wireless communication terminal compares the number of TIDs of the A-MPDU to be transmitted to the AP and the maximum number of TIDs, the wireless communication terminal may not calculate the number of action frames as the number of TIDs of the A-MPDU. Specifically, when the value of the TID Aggregation Limit field is within a predetermined range, the wireless communication terminal may generate an A-MPDU to be transmitted to the AP by aggregating action frames regardless of the value of the TID Aggregation Limit field. Specifically, in the embodiments of FIGS. 8 to 10, the wireless communication terminal may not calculate the number of action frames as the number of TIDs of the A-MPDU.

In the embodiment of FIG. 11, the AP sets the value of the TID Aggregation Limit field of the User Info field corresponding to the third station of the trigger frame to 2 to indicate that the maximum value of the sum of the number of TIDs that the A-MPDU to be transmitted to the AP by the third station STA3 is capable of having and the number of frames without a TID requesting an immediate response included in the A-MPDU excluding an action frame is 3. At this time, the action frame is excluded from the maximum value calculation. The third station STA3 determines the number of sums of the number of TIDs requesting an immediate response of the A-MPDU to be transmitted to the AP and the number of frames without a TID requesting an immediate response included in the A-MPDU excluding an action frame based on the value of the TID Aggregation Limit field of the User Info field corresponding to the third station of the trigger frame. The third station STA3 determines that the A-MPDU to be transmitted to the AP has two TIDs requesting an immediate response based on the value of the TID Aggregation Limit field of the User Info field corresponding to the third station of the trigger frame. TIDs 1 and 2 request an immediate response, and TIDs 4 and 5 have the ACK policy set to No Ack. Also, action frames are excluded from counting. Accordingly, the third station STA1 aggregates an MPDU having a TID of 1, an MPDU having a TID of 2, an MPDU having a TID of 4, an MPDU having a TID of 5, an action frame, an action No Ack frame, and a QoS null frame to generate an A-MPDU to be transmitted to the AP. The third station STA3 transmits the generated A-MPDU to the AP. The AP transmits an M-BA frame to a plurality of wireless communication terminals including the third station STA3 based on the A-MPDU received from the third station SAT3. Through this embodiment, the AP adjusts the duration of the M-BA frame.

The AP may use the trigger information to instruct the wireless communication terminal transmitting the response to the trigger information to perform channel sensing before transmitting the response. Specifically, the AP may set the CS Required field value of the trigger information to instruct the wireless communication terminal transmitting the response to the trigger information to perform channel sensing before transmitting the response. The CS Required field indicates whether channel sensing is required when the wireless communication terminal transmits a response to the trigger information. At this time, when the value of the CS Required field is 1, the CS Required field may indicate that channel sensing is required. In addition, when transmitting the response to the trigger information, the wireless communication terminal receiving the trigger information may determine whether to perform channel sensing based on the CS Required field of the trigger information. Specifically, when the value of the CS Required field of the trigger information is 1, the wireless communication terminal receiving the trigger information may perform channel sensing when transmitting a response to the trigger information. At this time, the channel sensing may indicate whether the channel to transmit the response to the trigger information is idle or not. Also, channel sensing may indicate CCA operation.

Figure 12:
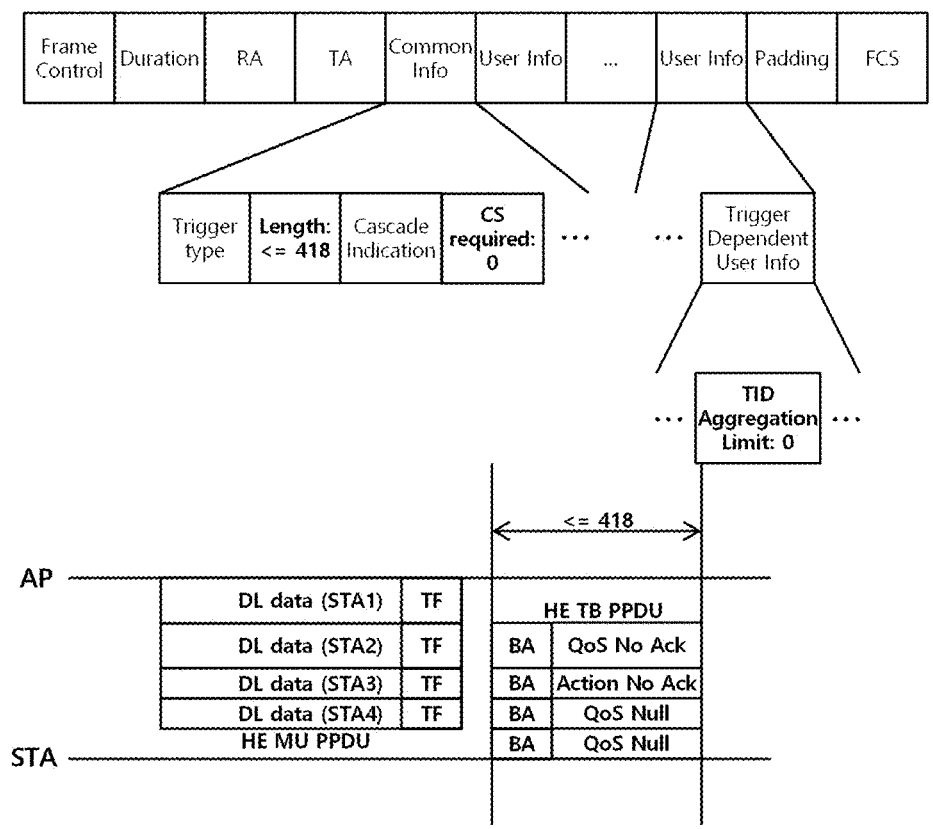
FIG. 12 shows an operation of the wireless communication terminal according to an embodiment of the present invention to set maximum number of TIDs information of a trigger frame.

FIG. 12 shows an operation of a wireless communication terminal according to an embodiment of the present invention to set the maximum number of TIDs information of a trigger frame.

When the AP triggers an immediate response to the data transmission using the trigger information, the AP may use the trigger information to indicate that no channel sensing is required when the wireless communication terminal transmits a response to the trigger information. Specifically, when the AP triggers an immediate response to the data transmission using the trigger information and the value of the length field of the common info field of the trigger information is less than or equal to the predetermined value, the AP may use the trigger information to indicate that no channel sensing is required when the wireless communication terminal transmits a response to the trigger information. At this time, the length field indicates information on the length of the trigger-based PPDU. Specifically, the length field may indicate information on the length of the trigger-based PPDU. In addition, the predetermined value may be 418 bytes. Through this, the AP may prevent the wireless communication terminal transmitting the response to the trigger information from not transmitting an immediate response due to the channel sensing. At this time, there is an operational problem that the wireless communication terminal transmits a response to the trigger information and data together. This is because, when a wireless communication terminal operating as an EDCA transmits data, the wireless communication terminal may be required to transmit data after performing channel sensing. Further, this is because, when a wireless communication terminal transmitting a response to the trigger information transmits an MPDU requesting an immediate response, an additional transmission sequence is required.

In the case where channel sensing is not required when the wireless communication terminal indicated by the trigger frame transmits a response to the trigger information, the AP may use the trigger frame to indicate that the wireless communication terminals indicated by the trigger frame is not allow to aggregate the MPDUs requesting an immediate response to generate an A-MPDU and transmit the generated A-MPDU. Specifically, in the case where channel sensing is not required when the wireless communication terminal indicated by the trigger frame transmits a response to the trigger information, the AP may set the value of the TID Aggregation Limit field of the User Info field of the trigger frame to 0 to indicate that the wireless communication terminal corresponding to the User Info field is not allowed to aggregate the MPDUs requesting an immediate response to generate an A-MPDU. Specifically, when the AP triggers an immediate response to the data transmission using the trigger information and the value of the length field of the common info field of the trigger information is less than or equal to the predetermined value, it may indicate that the wireless communication terminal indicated by the trigger frame is not allowed to aggregate the MPDUs requesting an immediate response to generate an A-MPDU and transmit the generated A-MPDU. In these embodiments, the wireless communication terminal may aggregate MPDUs not requesting an immediate response to generate an A-MPDU and transmit the generated A-MPDU to the AP.

In the embodiment of FIG. 12, the AP transmits HE MU PPDU to a plurality of stations. At this time, the HE MU PPDU includes a trigger frame requesting an immediate response to the data MPDU included in the HE MU PPDU. Also, the value of the length field of the Common Info field of the trigger frame is 418. In addition, the CS required bit of the trigger frame is set to 0. Therefore, the AP sets the value of the TID Aggregation Limit field of the User Info field of the trigger frame to 0. The wireless communication terminal receiving the trigger frame transmits a response to the data MPDU included in the HE MU PPDU and an A-MPDU including the MPDU not requesting an immediate response together. At this time, the value of the length field of the trigger frame triggering the trigger-based PPDU (HE TB PPDU) including the A-MPDU is less than or equal to 418. Therefore, the first station transmits the A-MPDU including the MPDU including the BA frame and the data in which the ACK Policy is No Ack. The second station transmits an A-MPDU including a BA frame and an action No Ack frame. The third station and the fourth station transmit an A-MPDU including a BA frame and a QoS null frame.

Through FIGS. 7 to 12, an operation in which the AP triggers the A-MPDU transmission of the wireless communication terminal using the trigger frame has been described. As described above, the AP may use the MAC header to trigger the wireless communication terminal to transmit the trigger-based PPDU to the AP. Specifically, the AP may insert the trigger information into the HE variant HT control field of the MAC header to trigger the wireless communication terminal to transmit the trigger-based PPDU to the AP. At this time, the trigger information included in the MAC header is referred to as UL MU response scheduling (UL MU RS). Through FIGS. 13 to 15, an operation in which the AP triggers the wireless communication terminal to transmit the trigger-based PPDU including the A-MPDU using the UL MU RS will be described.

Figure 13:
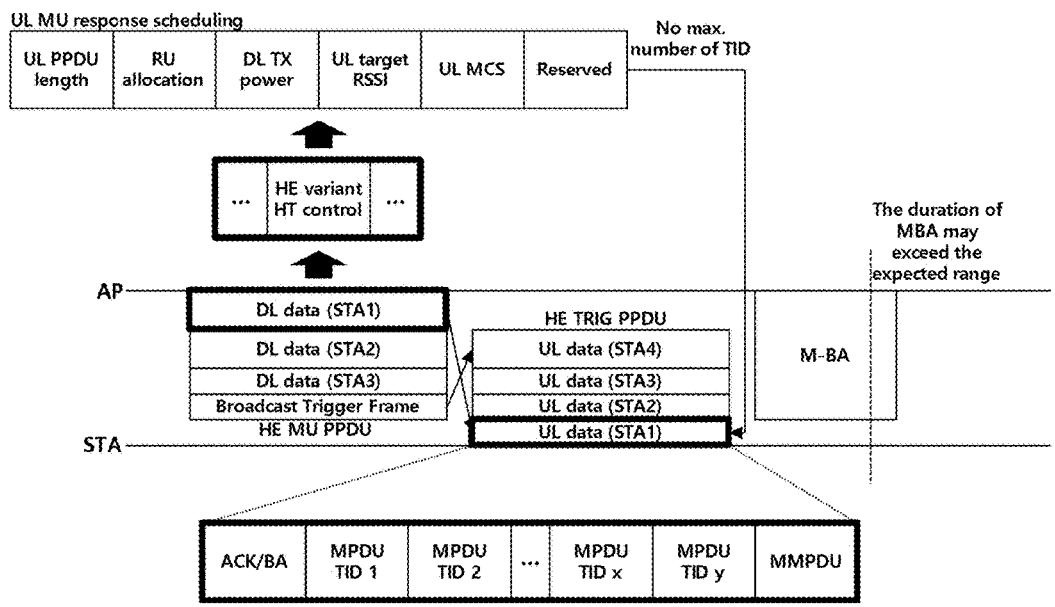
FIG. 13 describes an operation in which a wireless communication terminal according to an embodiment of the present invention transmits an A-MPDU based on UL MU RS.

FIG. 13 describes an operation in which a wireless communication terminal according to an embodiment of the present invention transmits an A-MPDU based on UL MU RS.

Since the UL MU RS is included in the MAC header, the size of the field that may be used by the UL MU RS may be limited. Specifically, the UL MU RS is identified by a 4-bit Control ID field in the HE variant HT control field and may indicate the trigger information using a 26-bit field. In addition, the UL MU RS may trigger an ACK/BA frame transmission for the payload included in the MAC frame including the UL MU RS. In addition, the UL MU RS may trigger the transmission of the wireless communication terminal corresponding to the recipient address in the MAC frame including the UL MU RS. In these embodiments, the UL MU RS may include less information than the trigger frame. Therefore, the UL MU RS may not include the maximum number of TIDs information. The wireless communication terminal receiving the MAC frame including the UL MU RS may transmit the Trigger Based PPDU (TB PPDU) within the UL PPDU length indicated by the UL MU RS. Accordingly, the wireless communication terminal receiving the MAC frame including the UL MU RS may generate the A-MPDU to be transmitted to the AP regardless of the number of TIDs that the A-MPDU is capable of having.

In the embodiment of FIG. 13, the AP transmits an HE MU PPDU including a data MPDU for each of the first station STA1 to the third station STA3 and a broadcast trigger frame. At this time, the MAC header of the data MPDU for each of the first station STA1 to the third station STA3 includes UL MU RS. Each of the first to third stations STA1 to STA3 generates an A-MPDU including an ACK/BA frame, a data MPDU, and an MPDU based on UL MU RS. Each of the first to third stations STA1 to STA3 transmits the generated A-MPDU to the AP using the HE MU PPDU. The first station STA1 aggregates an ACK/BA frame, an MPDU corresponding to each of a plurality of TIDs, and an MMPDU to generate an A-MPDU.

When a wireless communication terminal receiving a MAC frame including an UL MU RS transmits an A-MPDU having a TID exceeding the total number of TIDs that the AP may receive to the AP, the AP may not receive the A-MPDU or may malfunction. Accordingly, there is a need for a method to prevent this.

Figure 14:
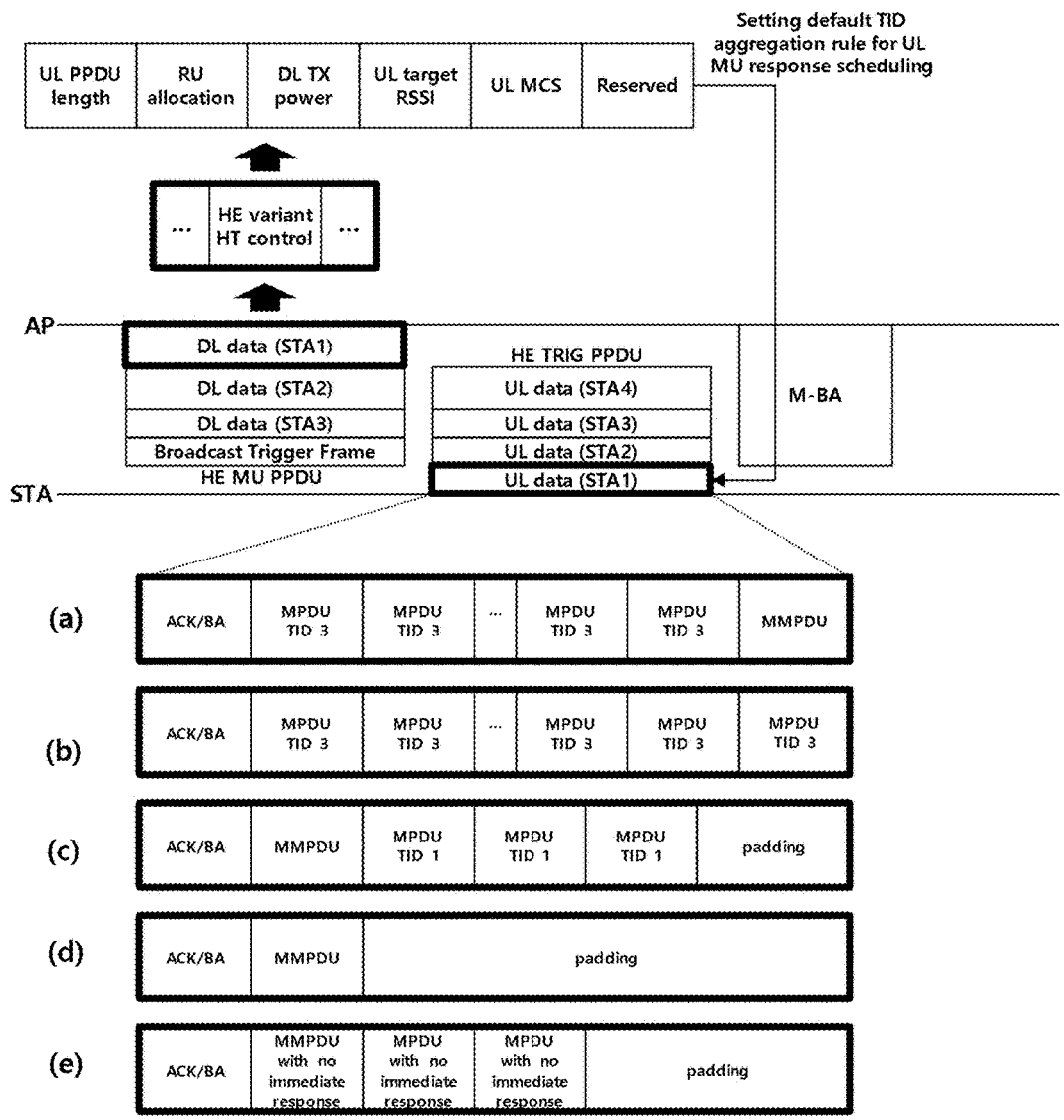
FIG. 14 describes an operation in which a wireless communication terminal according to another embodiment of the present invention transmits an A-MPDU based on UL MU RS.

FIG. 14 describes an operation in which a wireless communication terminal according to another embodiment of the present invention transmits an A-MPDU based on UL MU RS.

As described above, the wireless communication terminal receiving the UL MU RS may generate the A-MPDU including the ACK/BA frame. The wireless communication terminal receiving the UL MU RS may transmit the generated A-MPDU to the AP using the information indicated by the UL MU RS. At this time, the MPDU that the wireless communication terminal receiving the UL MU RS may aggregate with the ACK/BA frame may be limited to at least one of the MPDU corresponding to one TID and one MMPDU. Accordingly, the wireless communication terminal receiving the UL MU RS may generate the A-MPDU by aggregating the ACK/BA frame with at least one of the MPDU corresponding to one TID and one MMPDU. At this time, the M-BA frame transmitted by the AP may include at most two BA information fields per wireless communication terminal. This is because the MMPDU in the M-BA frame is treated as having a TID of 1111. In the embodiment of FIG. 14, the AP transmits the HE MU PPDU to the first station STA1 to the third station STA3 as in the embodiment of FIG. 13. At this time, the first station STA1 transmits the A-MPDU to the AP based on the UL MU RS included in the MAC frame transmitted to the first station STA1. In the embodiment of FIG. 14(a), the first station STA1 aggregates an ACK/BA frame, an MPDU corresponding to a TID of 3, and an MMPDU to generate an A-MPDU.

In another specific embodiment, the MPDU that the wireless communication terminal receiving the UL MU RS is capable of aggregating with the ACK/BA frame may be limited to any one of the MPDU corresponding to one TID and one MMPDU. Accordingly, the wireless communication terminal receiving the UL MU RS may generate the A-MPDU by aggregating the ACK/BA frame with any one of the MPDU corresponding to one TID and one MMPDU. At this time, the M-BA frame transmitted by the AP may include at most one BA information field per wireless communication terminal. In the embodiment of FIG. 14(b), the first station STA1 aggregates an ACK/BA frame and an MPDU corresponding to a TID of 3 to generate an A-MPDU.

In another specific embodiment, the MPDU that the wireless communication terminal receiving the UL MU RS may aggregate with the ACK/BA frame may be limited to at least one of the MMPDU and the MPDU corresponding to the high priority TID. Accordingly, the wireless communication terminal receiving the UL MU RS may generate the A-MPDU by aggregating any one of an ACK/BA frame, an MMPDU, and an MPDU having a high priority MPDU. At this time, a TID having a high preference may indicate a TID having a priority higher than a certain priority. Specifically, the certain priority may be designated by the AP. In a specific embodiment, the AP may specify a certain priority in the link setup procedure. For example, the AP may designate a certain priority by using at least one of a beacon frame, an association response frame, and an authentication response frame. In the embodiment of FIG. 14(c), the first station STA1 generates an A-MPDU by aggregating an ACK/BA frame, an MPDU in which a TID having a priority higher than a certain priority corresponds to 1, and an MMPDU.

In another specific embodiment, the MPDU that the wireless communication terminal receiving the UL MU RS may aggregate with the ACK/BA frame may be limited to an MMPDU. Accordingly, the wireless communication terminal receiving the UL MU RS may aggregate an ACK/BA frame and an MMPDU to generate an A-MPDU. In the embodiment of FIG. 14(d), the first station STA1 aggregates an ACK/BA frame and an MPDU corresponding to a TID of 3 to generate an A-MPDU.

In addition, the wireless communication terminal receiving the UL MU RS may aggregate an ACK/BA frame and an MPDU corresponding to the TID with no BA agreement without limitation in the embodiments described above.

In another specific embodiment, the MPDU that the wireless communication terminal receiving the UL MU RS may aggregate with the ACK/BA frame may be limited to an MPDU not requesting an immediate response. Accordingly, the wireless communication terminal receiving the UL MU RS may aggregate an ACK/BA frame and an MPDU not requesting an immediate response to generate an A-MPDU. In the embodiment of FIG. 14(e), the first station STA1 aggregates an ACK/BA frame and an MPDU not requesting an immediate response to generate an A-MPDU. The wireless communication terminal may prevent the transmission sequence from being increased through such an embodiment.

In another specific embodiment, the wireless communication terminal receiving the UL MU RS may transmit the A-MPDU including the ACK/BA frame without aggregating the ACK/BA frame with another MPDU. The wireless communication terminal may maximize the reliability of ACK/BA frame transmission.

Figure 15:
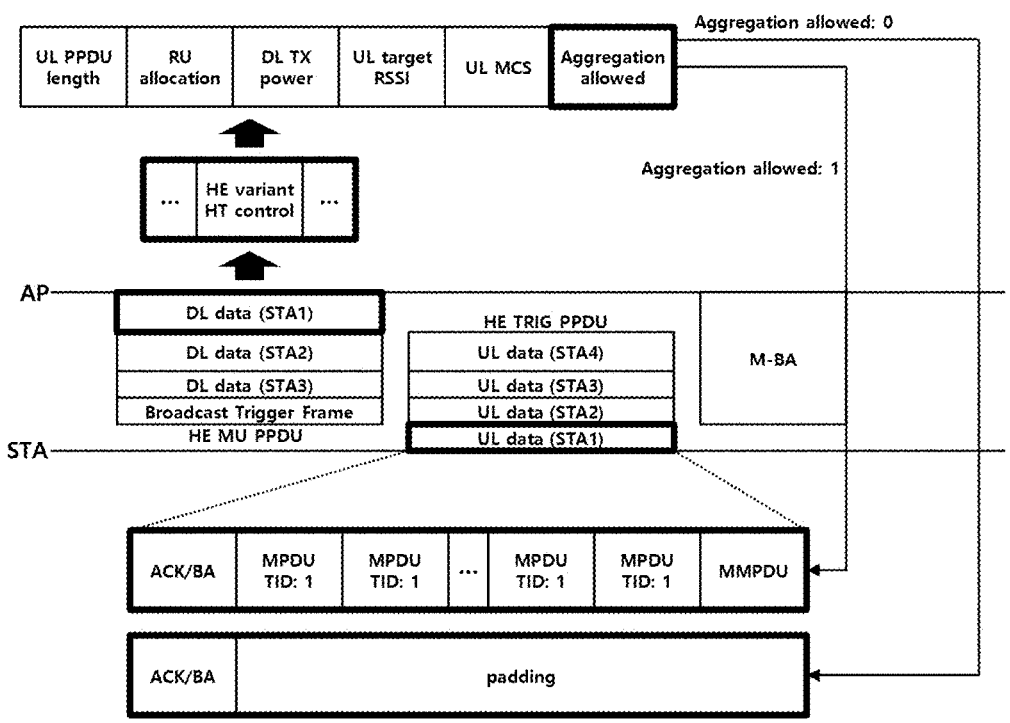
FIG. 15 describes an operation in which a wireless communication terminal according to another embodiment of the present invention transmits an A-MPDU based on UL MU RS.

FIG. 15 describes an operation in which a wireless communication terminal according to another embodiment of the present invention transmits an A-MPDU based on UL MU RS.

The AP may signal that the aggregation of ACK/BA frames and other MPDUs transmitted based on the UL MU RS is restricted while transmitting the UL MU RS. Specifically, the AP sets a bit indicating whether to allow the aggregation of UL MU RS to 0 to signal that the aggregation of ACK/BA frames and other MPDUs transmitted based on the UL MU RS is restricted. When UL MU RS indicates that the aggregation of ACK/BA frames and other MPDUs transmitted based on UL MU RS is restricted, the wireless communication terminal receiving the UL MU RS may generate the A-MPDU including the ACK/BA frame according to the various embodiments described with reference to FIG. 14. Specifically, when the UL MU RS indicates that the aggregation of the ACK/BA frames and other MPDUs is restricted, the wireless communication terminal receiving the UL MU RS may transmit the A-MPDU including the ACK/BA frame to the AP without aggregation with another MPDU. In another specific embodiment, when the UL MU RS indicates that the aggregation of the ACK/BA frames and other MPDUs is restricted, the wireless communication terminal receiving the UL MU RS may transmit an A-MPDU including an ACK/BA frame and an MPDU not requesting an immediate response to the AP.

In the embodiment of FIG. 15, the AP sets the value of the Aggregation allowed field included in the UL MU RS to indicate that the aggregation of ACK/BA frames and MPDUs transmitted based on UL MU RS is restricted. At this time, when the value of the Aggregation allowed field is 0, the first station STA1 transmits an A-MPDU including an ACK/BA frame and padding to the AP. Also, when the value of the aggregation allowed field is 1, the first station STA1 transmits an A-MPDU including an ACK/BA frame, an MPDU with a TID of 1, and an MMPDU to the AP. Through this embodiment, the form of the A-MPDU transmitted on the basis of the UL MU RS may be varied.

When a Received Signal Strength Indication (RSSI) difference between the MU PPDUs transmitted by a plurality of wireless communication terminals is large, it may be difficult for the AP to normally receive the MU PPDU from the plurality of wireless communication terminals. Thus, the AP may use the trigger information to adjust the transmission power of the MU PPDUs transmitted by each of the plurality of wireless communication terminals. This will be described with reference to FIGS. 16 to 23.

Figure 16:
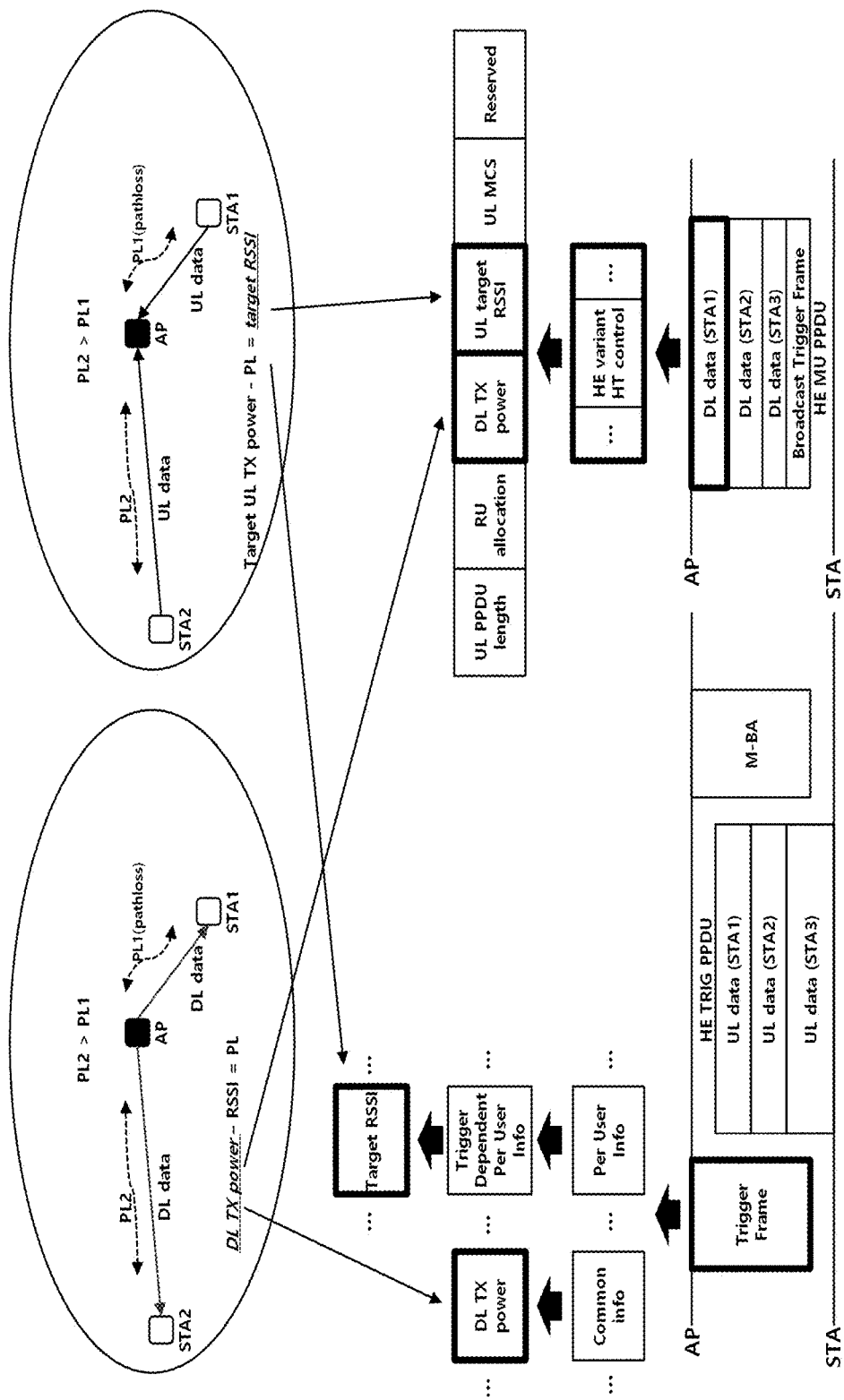
FIG. 16 shows that an AP according to an embodiment of the present invention signals the transmission power of a trigger frame to a plurality of wireless communication terminals using a trigger frame, and a plurality of wireless communication terminals adjust the transmission power of an MU PPDU based on the transmission power of a trigger frame.

FIG. 16 shows that an AP according to an embodiment of the present invention signals the transmission power of a trigger frame to a plurality of wireless communication terminals using a trigger frame, and a plurality of wireless communication terminals adjust the transmission power of an MU PPDU based on the transmission power of a trigger frame.

The size of the path loss occurring during transmission differs depending on the location of the wireless communication terminal. At this time, the path loss indicates that the intensity of the signal is attenuated while the wireless signal is transmitted along a specific path. In FIG. 16, the second station STA2 is located farther from the AP than the first station STA1, and the path loss PL2 generated during transmission between the second station STA2 and the AP is larger than the path loss PL1 generated during transmission between the first station STA1 and the AP. Therefore, in order to adjust the RSSI of the MU PPDU received by the AP to the RSSI designated by the AP, the wireless communication terminal must calculate the path loss occurring in the transmission path from the wireless communication terminal to the AP. For this, the AP may insert information on the transmission power for transmitting the PPDU including the trigger information into the trigger information. Specifically, the AP may insert the transmission power into at least one of the trigger frame and the UL MU RS. At this time, the RSSI designated by the AP is referred to as a target RSSI. In addition, the transmission power for transmitting the PPDU including trigger information is referred to as DL TX power. For example, the AP may insert information on the DL TX power into the Common Info field of the trigger frame as shown in FIG. 16. In addition, the AP may insert information on the target RSSI into the Trigger Dependent Info field of the Per User Info field of the trigger frame as shown in FIG. 16. In addition, the AP may insert information on the DL TX power into the HE variant HT control field as shown in FIG. 16. In addition, the AP may insert information on the target RSSI into the HE variant HT control field as shown in FIG. 16.

The wireless communication terminal may obtain information on the DL TX power based on the trigger information received from the AP. The wireless communication terminal may estimate the path loss occurring in the transmission path between the wireless communication terminal and the AP based on the RSSI of the PPDU including the DL TX power and the trigger information. Specifically, the wireless communication terminal may estimate the path loss occurring in the transmission path between the wireless communication terminal and the AP by subtracting the RSSI of the PPDU including the trigger information from the DL TX power based on the trigger information as shown in FIG. 16. Specifically, the DL TX power may be displayed in 20 MHz units in the trigger information.

The wireless communication terminal may measure the RSSI of the PPDU in the physical layer, and obtain information on the DL TX power and information on the target RSSI included in the trigger information from the MAC layer. At this time, the wireless communication terminal measures the RSSI in advance, and determines the transmission power of the trigger-based PPDU based on the information on the DL TX power and the information on the target RSSI obtained in the MAC layer. Specifically, the wireless communication terminal adds the path loss occurring in the transmission path between the AP and the wireless communication terminal to the target RSSI based on RSSI and DL TX power as shown in FIG. 16 to determine the transmission power (Target UL TX Power) of the trigger-based PPDU. The wireless communication terminal transmits the trigger-based PPDU with the determined transmission power.

Even with the same PPDU, the size of the allocated power may vary depending on the frequency and time. Therefore, according to the method of the wireless communication terminal to measure the RSSI of the PPDU including the trigger information, the path loss estimation occurring in the transmission between the AP and the wireless communication terminal may become inaccurate. Especially, when a PPDU including trigger information is transmitted through a bandwidth of 80 MHz or more and a center 26 Resource Unit (RU) exists in the center of the 80 MHz bandwidth, the center 26 RU is located in the center of two consecutive 20 MHz frequency bands. Specifically, the center 26 RU may indicate a RU that includes subcarriers corresponding to indices from −16 to −4 and from 4 to 16 and 7 Direct Current (DC) subcarriers located at the center of the frequency band. Therefore, it may be a problem that which frequency band's RSSI the wireless communication terminal that receives the payload of the PPDU through the center 26 RU should measure. A method of the wireless communication terminal to measure the RSSI of the MU PPDU will be described with reference to FIGS. 17 to 23. At this time, the MU PPDU may include trigger information as described above.

Figure 17:
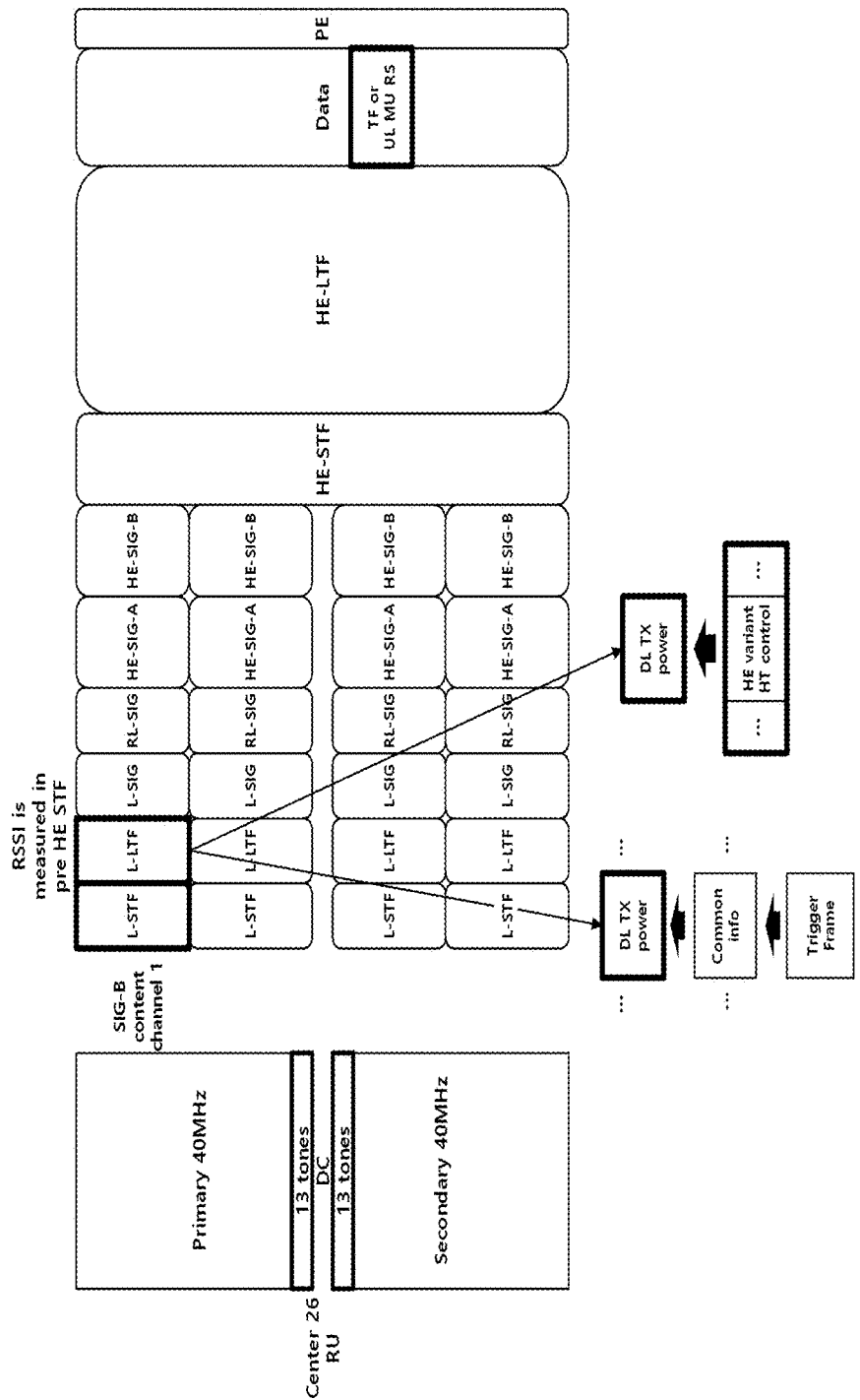
FIG. 17 shows a method of a wireless communication terminal to measure the RSSI of a MU PPDU according to an embodiment of the present invention.

FIG. 17 shows a method of a wireless communication terminal to measure the RSSI of an MU PPDU according to an embodiment of the present invention.

The wireless communication terminal may measure the RSSI of the legacy preamble of the PPDU transmitted on the primary channel having the bandwidth of 20 MHz as the RSSI of the PPDU. At this time, the legacy preamble indicates a preamble that may be decoded by not only the wireless communication terminal according to the embodiment of the present invention but also the legacy wireless communication terminal. Specifically, the wireless communication terminal may measure the RSSI of the legacy training field of the PPDU transmitted on the primary channel having the bandwidth of 20 MHz as the RSSI of the PPDU. In a specific embodiment, the wireless communication terminal may measure the RSSI of the Legacy-Long Training Field (L-LTF) transmitted on the primary channel having a bandwidth of 20 MHz as the RSSI of the PPDU. In another specific embodiment, the wireless communication terminal may measure an average value of RSSI of an L-LTF and a legacy short training field (L-STF) transmitted on a primary channel having a bandwidth of 20 MHz as the RSSI of the PPDU. At this time, L-LTF indicates a long training signal, which is a training signal having a relatively long signal length. Specifically, the wireless communication terminal may estimate a frequency offset and a channel of an OFDM symbol including an L-SIG field based on the LTF. Also, L-STF indicates a short training signal, which is a training signal having a relatively short length. Specifically, the wireless communication terminal may perform Automatic Gain Control (AGC) on an OFDM symbol including an L-LTF field and an L-SIG field based on L-STF. Also, the wireless communication terminal may synchronize the timing and frequency with the OFDM symbol including the L-SIG field based on the L-STF. The wireless communication terminal adjusts the transmission power based on the RSSI of the PPDU measured through the above-described embodiments.

In the embodiment of FIG. 17, the AP transmits an HE MU PPDU having an 80 MHz bandwidth including the center 26 RU to a plurality of wireless communication terminals. The HE MU PPDU includes L-STF, L-LTF, L-SIG, RL-SIG, HE-SIG-A, HE-SIG-B, HE-STF, HE-LTF, payload Data, and packet extension PE. At this time, a plurality of wireless communication terminals measure the RSSI of L-STF and L-LTF transmitted through a primary channel having a bandwidth of 20 MHz. The plurality of wireless communication terminals estimate the path loss occurring in transmission from the AP to each of the plurality of wireless communication terminals based on the measured RSSI and DL TX power. At this time, the plurality of wireless communication terminals may obtain the DL TX power from the trigger frame or the UL MU RS. The plurality of wireless communication terminals determine the transmission power of the trigger-based PPDU based on the estimated path loss and the target RSSI. The plurality of wireless communication terminals transmit the trigger-based PPDU to the AP according to the trigger frame or the information indicated by the UL MU RS.

The wireless communication terminal detects a primary channel having a bandwidth of 20 MHz regardless of the position of the RU to which the payload received by the wireless communication terminal is transmitted. In addition, in the case of the legacy preamble, the PPDU may be transmitted with the same power in the frequency band in which the PPDU is transmitted. Therefore, when the wireless communication terminal measures the RSSI of the PPDU based on the legacy preamble transmitted through the 20 MHz band, the wireless communication terminal may efficiently measure the RSSI of the PPDU. In addition, a wireless communication terminal that receives the payload of the PPDU through the center 26 RU may also accurately measure the RSSI of the PPDU. Also, the wireless communication terminal may measure the RSSI of the PPDU in the same manner when receiving the trigger frame transmitted in the form of the non-HT PPDU.

Figure 18:
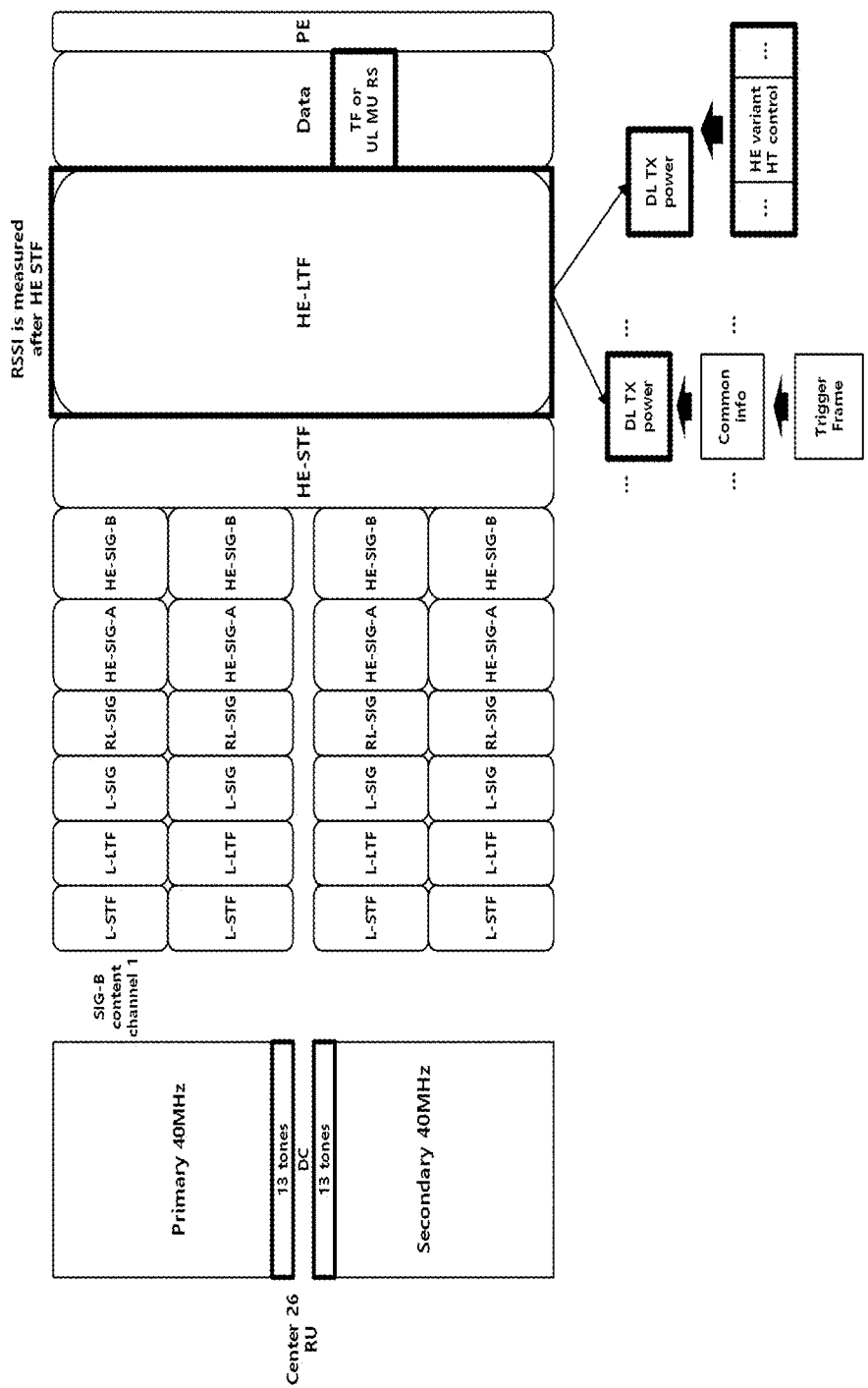
FIG. 18 shows a method of a wireless communication terminal to measure the RSSI of a MU PPDU according to another embodiment of the present invention.

FIG. 18 shows a method of a wireless communication terminal to measure the RSSI of an MU PPDU according to another embodiment of the present invention.

The wireless communication terminal may measure the RSSI of the PPDU in the entire frequency band in which the PPDU is transmitted. At this time, the wireless communication terminal may average the RSSI measured in the entire frequency band in which the PPDU is transmitted in units of 20 MHz. Specifically, the wireless communication terminal may measure the RSSI of the legacy preamble as the RSSI of the PPDU in the entire frequency band in which the PPDU is transmitted. Specifically, the wireless communication terminal may measure the RSSI of the PPDU based on a value obtained by averaging the RSSI of the legacy preamble in the entire frequency band in which the PPDU is transmitted in units of 20 MHz bandwidth. But, unlike the payload of PPDUs transmitted using 256 FFTs, the legacy preamble is transmitted using 64 FFTs. Accordingly, when the wireless communication terminal measures the RSSI of the PPDU based on the legacy preamble, an error may be generated accordingly.

The wireless communication terminal may measure the RSSI of the PPDU based on the non-legacy training field. The wireless communication terminal may measure the RSSI of the non-legacy training field as the RSSI of the PPDU in the entire frequency band in which the PPDU is transmitted. Specifically, the wireless communication terminal may measure the RSSI of the PPDU based on a value obtained by averaging the RSSI of the non-legacy training field in units of 20 MHz bandwidth in the entire frequency band in which the PPDU is transmitted. In a specific embodiment, the wireless communication terminal subtracts a value obtained by averaging the RSSI of the non-legacy training field in units of 20 MHz bandwidth in the entire frequency band in which the PPDU is transmitted from the DL TX power obtained from the trigger information, thereby estimating the path loss occurring in the transmission path between the wireless communication terminal and the AP. In such embodiments, the wireless communication terminal may obtain information on the bandwidth of the PPDU signaling the MU PPDU to measure the RSSI of the non-legacy training field in the entire frequency band in which the PPDU is transmitted. Also, the non-legacy training field may be a non-legacy long training field. The wireless communication terminal may estimate the frequency offset and channel of the OFDM symbol including the non-legacy signaling field and the payload based on the non-legacy long training field. Specifically, the wireless communication terminal may estimate a channel in which data is transmitted based on a non-legacy long training field. Also, the wireless communication terminal may estimate the frequency offset of the OFDM symbol based on the non-legacy long training field. In addition, the wireless communication terminal may perform Automatic Gain Control (AGC) on an OFDM symbol including a non-legacy long training field, a non-legacy signaling field, and a payload based on a short training signal. In addition, the wireless communication terminal may perform synchronization on the timing and frequency of the OFDM symbols including the non-legacy long training field, the non-legacy signaling field and the payload based on the non-legacy short training field.

In the embodiment of FIG. 18, the AP transmits an HE MU PPDU having an 80 MHz bandwidth including the center 26 RU to a plurality of wireless communication terminals. The HE MU PPDU includes L-STF, L-LTF, L-SIG, RL-SIG, HE-SIG-A, HE-SIG-B, HE-STF, HE-LTF, payload Data, and packet extension PE. At this time, a plurality of wireless communication terminals cross-correlate HE-LTF, which is a non-legacy long training field, to measure the RSSI of the HE-LTF. The plurality of wireless communication terminals estimate the path loss occurring in transmission from the AP to each of the plurality of wireless communication terminals based on the measured RSSI and DL TX power. Other operations of the plurality of wireless communication terminals may be the same as those described in the embodiment of FIG. 17.

However, when an AP transmits an HE MU PPDU using OFDMA, the AP may set transmission power differently for each RU. Specifically, when the AP transmits the HE MU PPDU using the OFDMA, the AP may set the transmission power differently for each RU from HE-STF, which is the non-legacy short training field. In particular, when 256 FFTs are used, the effect of frequency selectivity for each RU may be greater. The RSSI measurement method considering the transmission power difference for each RU will be described with reference to FIG. 19.

Figure 19:
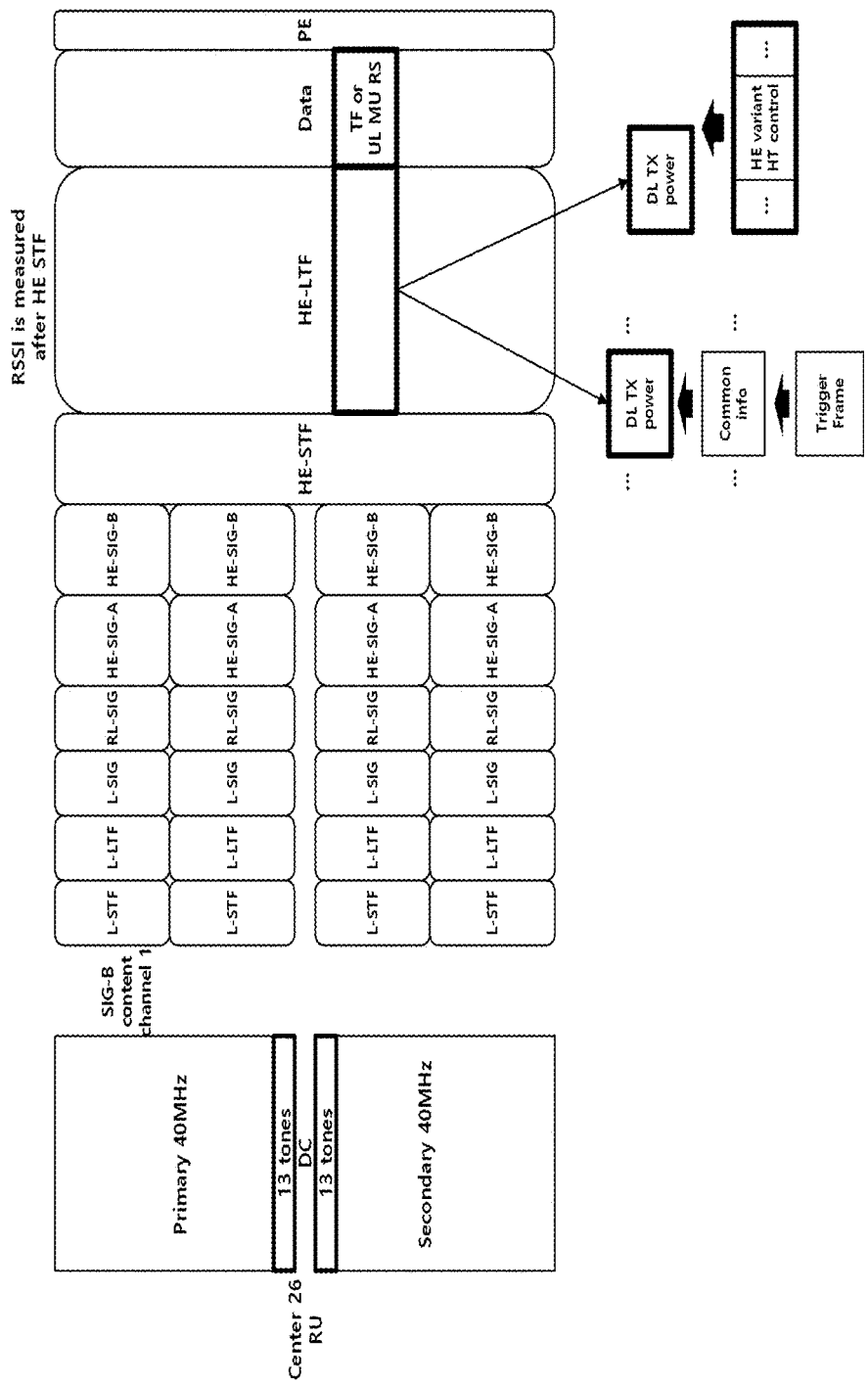
FIG. 19 shows a method of a wireless communication terminal to measure the RSSI of a MU PPDU according to another embodiment of the present invention.

FIG. 19 shows a method of a wireless communication terminal to measure the RSSI of an MU PPDU according to another embodiment of the present invention.

The wireless communication terminal may measure the RSSI of the non-legacy training field as the RSSI of the PPDU in the RU through which the payload of the PPDU is transmitted, which corresponds to the wireless communication terminal. At this time, the non-legacy training field may be HE-LTF, which is a non-legacy long training field. In addition, the RU through which the payload of the PPDU is transmitted may indicate a RU through which a trigger frame for triggering the wireless communication terminal or UL MU RS is transmitted. Specifically, when the bandwidth of the RU through which the payload of the PPDU is transmitted is smaller than 20 MHz, the wireless communication terminal may scale the measured RSSI in units of 20 MHz.

In the embodiment of FIG. 19, the AP transmits an HE MU PPDU having an 80 MHz bandwidth including the center 26 RU to a plurality of wireless communication terminals. The HE MU PPDU includes L-STF, L-LTF, L-SIG, RL-SIG, HE-SIG-A, HE-SIG-B, HE-STF, HE-LTF, payload Data, and packet extension PE. At this time, a plurality of wireless communication terminals cross-correlate HE-LTF to measure the RSSI of the HE-LTF in a RU through which a payload for each of the plurality of wireless communication terminal is transmitted. The plurality of wireless communication terminals estimate the path loss occurring in transmission from the AP to each of the plurality of wireless communication terminals based on the measured RSSI and DL TX power. At this time, when the bandwidth of the RU is smaller than 20 MHz, the measured RSSI value may be scaled in units of 20 MHz. Other operations of the plurality of wireless communication terminals may be the same as those described in the embodiment of FIG. 17.

In this embodiment, when the frequency band of the RU through which the payload of the PPDU corresponding to the wireless communication terminal is transmitted is too narrow, the number of sample symbols that the wireless communication terminal may use to measure the RSSI may be excessively small. Accordingly, the accuracy of the RSSI measured by the wireless communication terminal may deteriorate.

Figure 20:
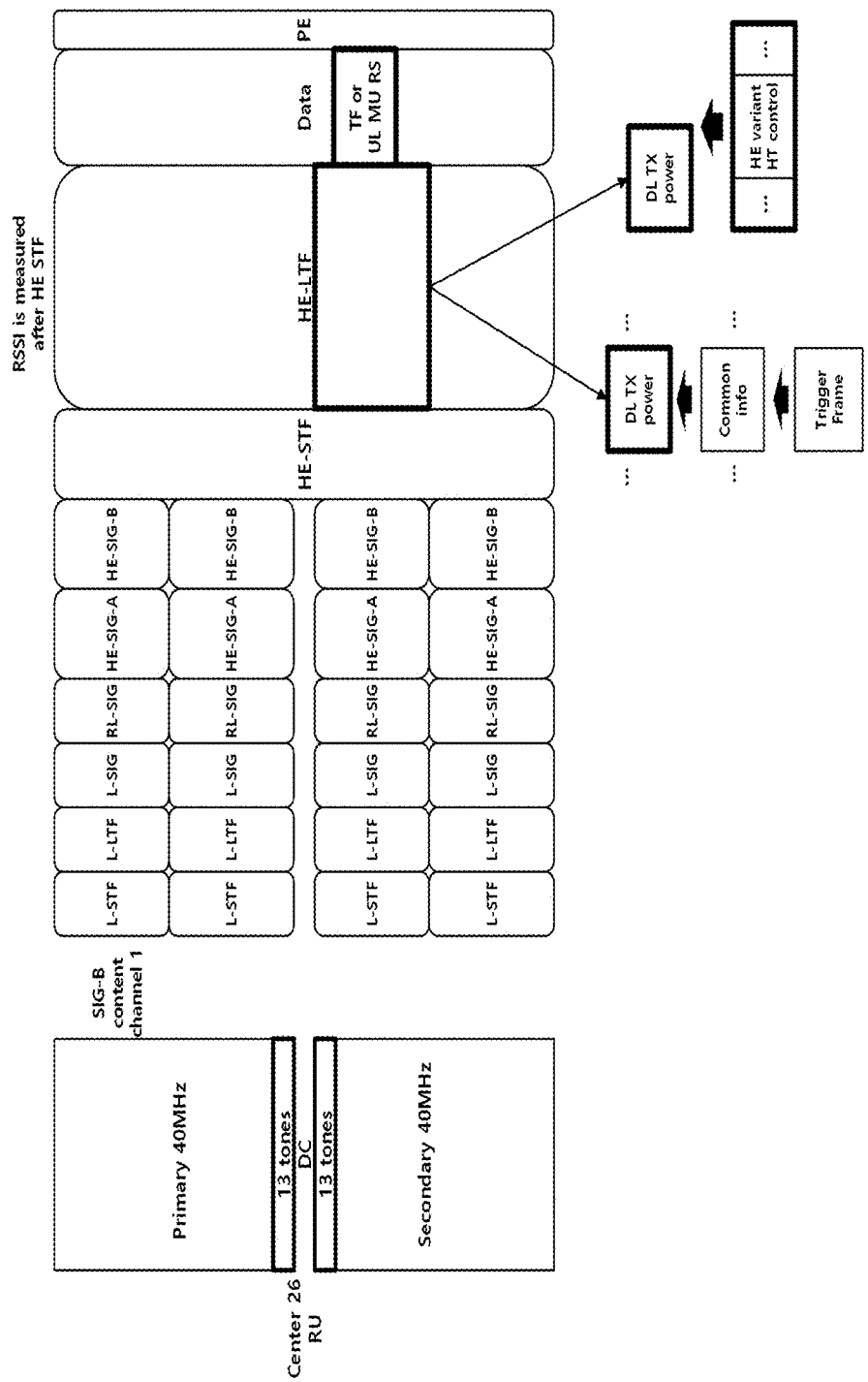
FIG. 20 shows a method of a wireless communication terminal to measure the RSSI of a MU PPDU according to another embodiment of the present invention.

FIG. 20 shows a method of a wireless communication terminal to measure the RSSI of an MU PPDU according to another embodiment of the present invention.

The wireless communication terminal may measure the RSSI of the non-legacy training field as the RSSI of the PPDU in a frequency with a 20 MHz bandwidth including a RU through which the payload of the PPDU is transmitted, which corresponds to the wireless communication terminal. At this time, the non-legacy training field may be HE-LTF, which is a non-legacy long training field. In addition, the RU through which the payload of the PPDU is transmitted may indicate a RU through which a trigger frame for triggering the wireless communication terminal or UL MU RS is transmitted.

In the embodiment of FIG. 20, the AP transmits an HE MU PPDU having an 80 MHz bandwidth including the center 26 RU to a plurality of wireless communication terminals. The HE MU PPDU includes L-STF, L-LTF, L-SIG, RL-SIG, HE-SIG-A, HE-SIG-B, HE-STF, HE-LTF, payload Data, and packet extension PE. At this time, a plurality of wireless communication terminals cross-correlate HE-LTF to measure the RSSI of the HE-LTF in a frequency band with a 20 MHz bandwidth including an RU through which a payload for each of the plurality of wireless communication terminal is transmitted. The plurality of wireless communication terminals estimate the path loss occurring in transmission from the AP to each of the plurality of wireless communication terminals based on the measured RSSI and DL TX power. At this time, when the bandwidth of the RU is smaller than 20 MHz, the measured RSSI value may be scaled in units of 20 MHz. Other operations of the plurality of wireless communication terminals may be the same as those described in the embodiment of FIG. 17.

In such an embodiment, it may be a problem that in which frequency band the wireless communication terminal receiving the payload of the PPDU through the center 26 RU should measure the RSSI of the non-legacy signaling field.

Figure 21:
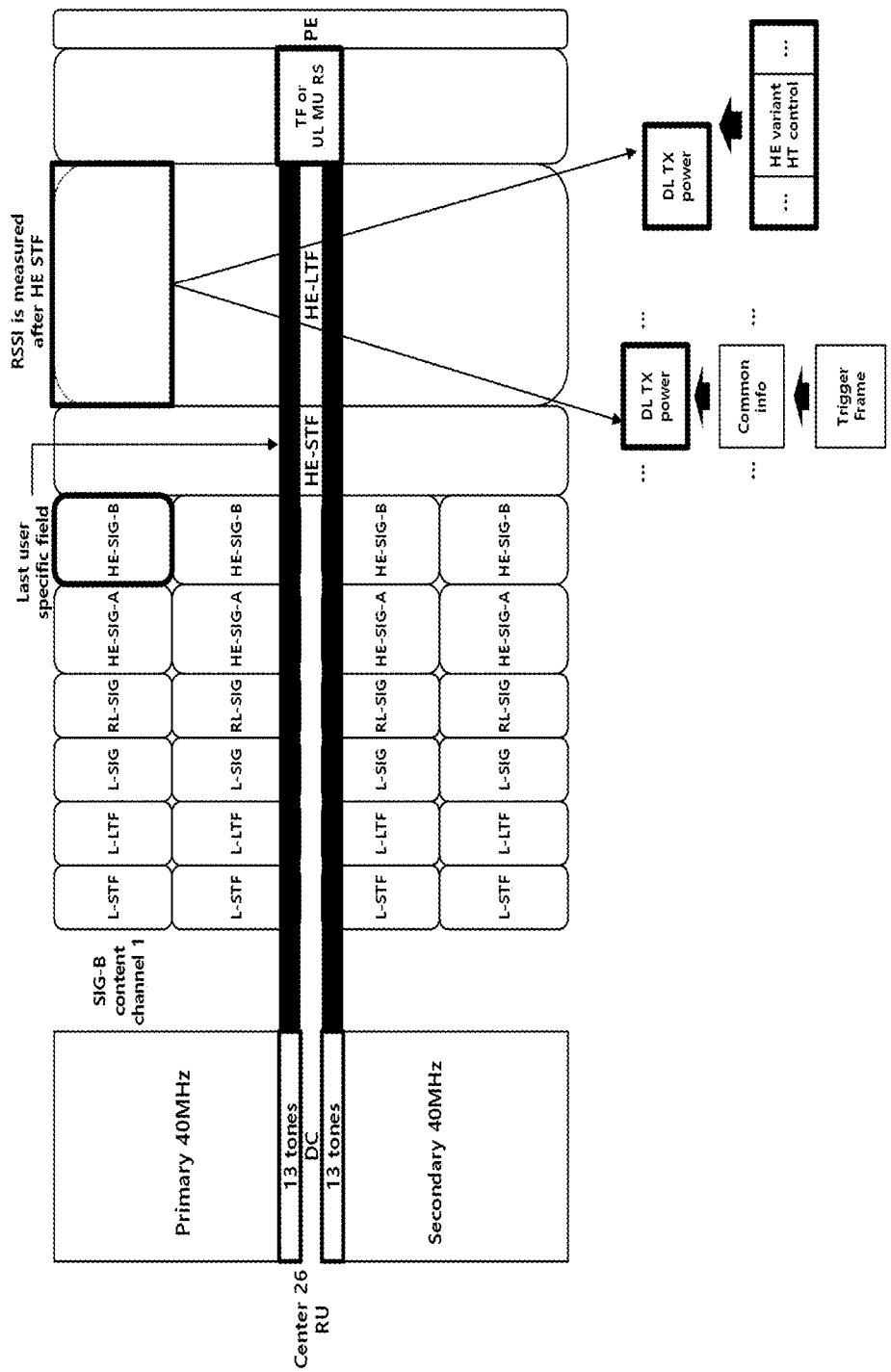
FIG. 21 shows a method of a wireless communication terminal to measure the RSSI of a MU PPDU according to another embodiment of the present invention.

FIG. 21 shows a method of a wireless communication terminal to measure the RSSI of an MU PPDU according to another embodiment of the present invention.

In the embodiments described above, when the wireless communication terminal receives the payload of the PPDU through the center 26 RU, the wireless communication terminal may measure the RSSI of the non-legacy signaling field in the frequency band in which the SIG-B content channel signaling information on the center 26 RU is transmitted. Specifically, the HE-SIG-B signaling field signals information on a plurality of wireless communication terminals receiving the HE MU PPDU. Specifically, the information on a plurality of wireless communication terminals may include information on resource allocation. At this time, the information on the resource allocation may include information on an RU that a plurality of wireless communication terminals receive the payload of the HE MU PPDU. The AP transmits an HE-SIG-B field including different information for each 20 MHz frequency band. Specifically, when an AP transmits an HE MU PPDU through a frequency band having a bandwidth of 40 MHz or more, the AP repeatedly transmits a first SIG-B content channel having a bandwidth of 20 MHz and a second SIG-B content channel having a bandwidth of 20 MHz every 40 MHz bandwidth. At this time, the AP transmits information on the center 26 RU of the primary channel having the 80 MHz bandwidth through the first SIG-B content channel. In addition, the AP transmits information on the center 26 RU of the subchannel having the 80 MHz bandwidth through the second SIG-B content channel. Therefore, when the wireless communication terminal receives the payload of the PPDU through the center 26 RU included in the primary channel having the bandwidth of 80 MHz, the wireless communication terminal may measure the RSSI of the non-legacy signaling field in the frequency band in which the first SIG-B content channel is transmitted. In addition, when the wireless communication terminal receives the payload of the PPDU through the center 26 RU included in the subchannel having the bandwidth of 80 MHz, the wireless communication terminal may measure the RSSI of the non-legacy signaling field in the frequency band in which the second SIG-B content channel is transmitted. In addition, the non-legacy training field may be HE-LTF, which is a non-legacy long training field.

In the embodiment of FIG. 21, the AP transmits an HE MU PPDU having an 80 MHz bandwidth including the center 26 RU to a plurality of wireless communication terminals. The HE MU PPDU includes L-STF, L-LTF, L-SIG, RL-SIG, HE-SIG-A, HE-SIG-B, HE-STF, HE-LTF, payload Data, and packet extension PE. At this time, the wireless communication terminal receiving the payload through the center 26 RU measures the RSSI of the HE-LTF by cross-correlating the HE-LTF in the frequency band having the 20 MHz bandwidth in which the first SIG-B content channel is transmitted. The wireless communication terminal estimate the path loss occurring in transmission from the AP to the wireless communication terminal based on the measured RSSI and DL TX power. In addition, the wireless communication terminal may obtain the DL TX power from the trigger frame or the UL MU RS. The plurality of wireless communication terminals determine the transmission power of the trigger-based PPDU based on the estimated path loss and the target RSSI. The plurality of wireless communication terminals transmit the trigger-based PPDU to the AP according to the trigger frame or the information indicated by the UL MU RS.

When the wireless communication terminal measures the RSSI of the non-legacy signaling field in the frequency band in which the SIG-B content channel for signaling the information on the center 26 RU is transmitted, the wireless communication terminal may obtain the HE-SIG-B field and measure the RSSI in the same frequency band. However, there is a disadvantage that the payload received by the wireless communication terminal is not transmitted in the frequency band in which the wireless communication terminal measures the RSSI.

Figure 22:
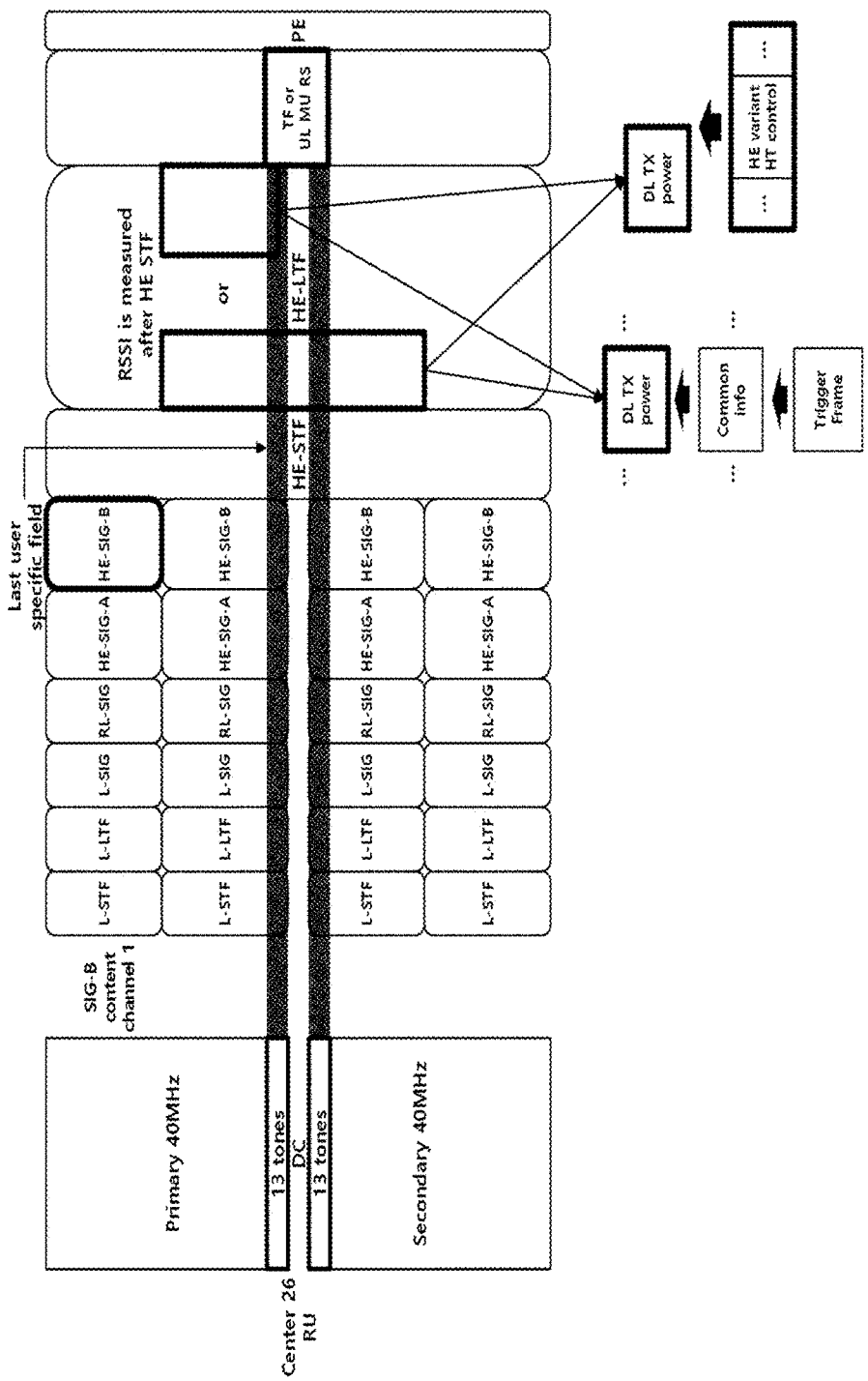
FIG. 22 shows a method of a wireless communication terminal to measure the RSSI of a MU PPDU according to another embodiment of the present invention.

FIG. 22 shows a method of a wireless communication terminal to measure the RSSI of a MU PPDU according to another embodiment of the present invention.

In the embodiments described above, when the wireless communication terminal receives the payload of the PPDU through the center 26 RU, the wireless communication terminal may measure the RSSI of the non-legacy signaling field in a frequency band close to the SIG-B content channel that signals information on the center 26 RU among two frequency bands having a 20 MHz bandwidth including the center 26 RU. In another specific embodiment, the wireless communication terminal may measure the RSSI of the non-legacy signaling field in two frequency bands having a 20 MHz bandwidth including the center 26 RU. At this time, the wireless communication terminal may average the measured RSSI in units of 20 MHz. In addition, the non-legacy training field may be HE-LTF, which is a non-legacy long training field.

In the embodiment of FIG. 22, the AP transmits an HE MU PPDU having an 80 MHz bandwidth including the center 26 RU to a plurality of wireless communication terminals. The HE MU PPDU includes L-STF, L-LTF, L-SIG, RL-SIG, HE-SIG-A, HE-SIG-B, HE-STF, HE-LTF, payload Data, and packet extension PE. At this time, the wireless communication terminal receiving the payload through the center 26 RU may measure the RSSI of the HE-LTF by cross-correlating the HE-LTF in the frequency band close to the first SIG-B content channel among the two frequency bands having the 20 MHz bandwidth including the center 26 RU. In another specific embodiment, at this time, the wireless communication terminal receiving the payload through the center 26 RU may measure the RSSI of the HE-LTF by cross-correlating the HE-LTF in the two frequency bands having the 20 MHz bandwidth including the center 26 RU, and average the RSSI in units of 20 MHz. Other operations of a wireless communication terminal may be the same as those described in the embodiment of FIG. 21.

Figure 23:
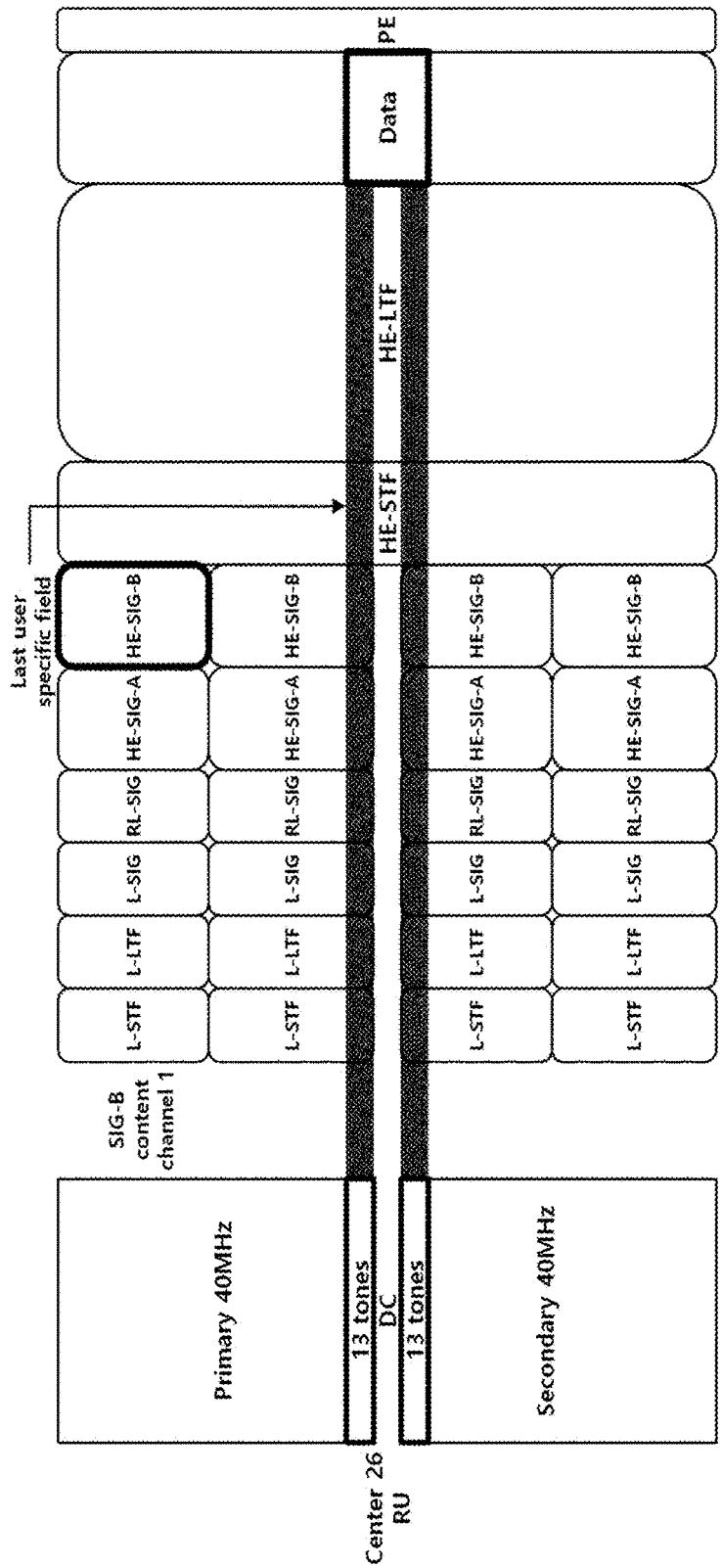
FIG. 23 shows a method of a wireless communication terminal to measure the RSSI of a MU PPDU according to another embodiment of the present invention.

FIG. 23 shows a method of a wireless communication terminal to measure the RSSI of an MU PPDU according to another embodiment of the present invention.

It may be restricted that the AP transmits trigger information through the center 26 RU. Specifically, the AP may not transmit trigger information through the center 26 RU. Specifically, the AP may not transmit a trigger frame through the center 26 RU. In addition, the AP may not transmit the UL MU RS through the center 26 RU. This is because the center 26 RU is used only when the bandwidth of the frequency band is over 80 MHz, and the size occupied by the center 26 RU is not large in the entire frequency band.

In the embodiment of FIG. 23, the AP transmits an HE MU PPDU having an 80 MHz bandwidth including the center 26 RU to a plurality of wireless communication terminals. The HE MU PPDU includes L-STF, L-LTF, L-SIG, RL-SIG, HE-SIG-A, HE-SIG-B, HE-STF, HE-LTF, payload Data, and packet extension PE. At this time, the AP transmits the payload of the PPDU, which does not include the trigger information, through the center 26 RU. In such an embodiment, the AP may prevent a problem that may occur when the wireless communication terminal receiving the payload of the PPDU through the center 26 RU measures the RSSI of the non-legacy signaling field.

Figure 24:
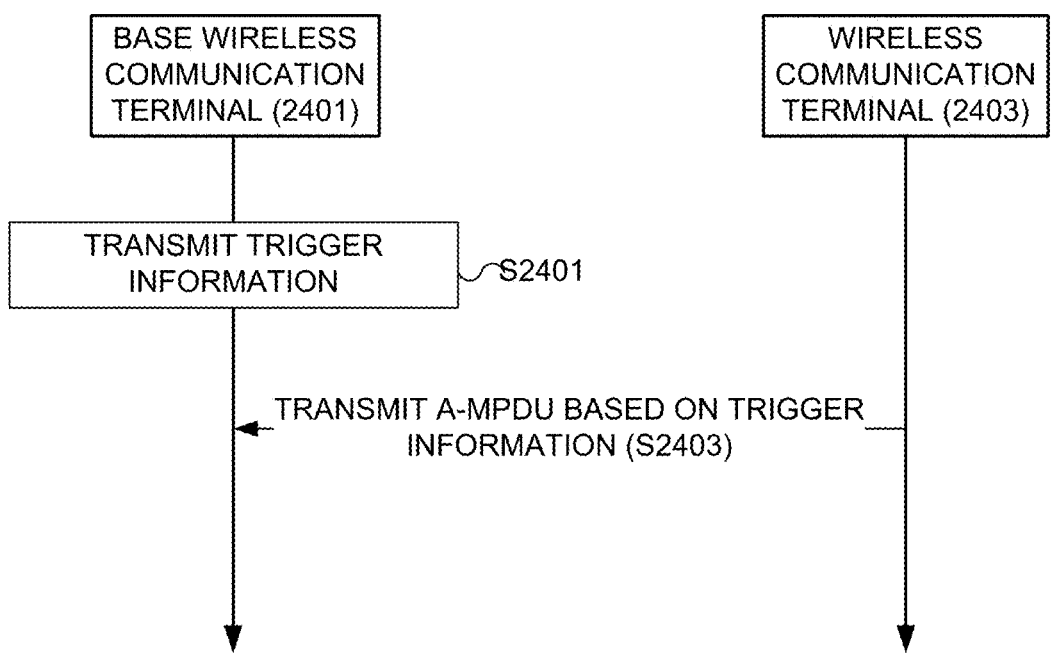
FIG. 24 shows the operation of a wireless communication terminal according to an embodiment of the present invention.

FIG. 24 shows the operation of a wireless communication terminal according to an embodiment of the present invention.

The base wireless communication terminal 2401 transmits the trigger information to one or a plurality of wireless communication terminals 2403 (S2401). At this time, the trigger information may be the trigger frame or UL MU RS described above.

The trigger information is a trigger frame, and the trigger frame may include a first signaling field indicating information on the type of MPDU included in the A-MPDU. At this time, when the wireless communication terminal 2403 is not allowed to aggregate the MPDU requesting the immediate response and generate the A-MPDU to be transmitted to the base wireless communication terminal 2401, the base wireless communication terminal 2401 may set the value of the first signaling field to a predetermined value. Also, when the base wireless communication terminal 2401 is allowed for the wireless communication terminal corresponding to the first signaling field to aggregate the MPDU requesting the immediate response and generate the A-MPDU to be transmitted to the base wireless communication terminal 2401, the base wireless communication terminal 2401 may set the value of the first signaling field according to the maximum number of TIDs that the A-MPDU is capable of having. The maximum number of TIDs that an A-MPDU is capable of having may indicate the maximum number of TIDs that request an immediate response that an A-MPDU is capable of having. The maximum number of TIDs requesting an immediate response may indicate the maximum value of the sum of the number of TIDs requesting an immediate response and the number of frames without a TID requesting an immediate response. In another specific embodiment, the maximum number of TIDs that an A-MPDU is capable of having may indicate the maximum number of TIDs with BA agreement.

At this time, an immediate response may indicate that the recipient transmits a response to the originator within a predetermined time period in the same TXOP. Specifically, the predetermined period may be a Short Inter-Frame Space (SIFS). The MPDU corresponding to the TID not requesting an immediate response may be the MPDU corresponding to the TID in which ACK policy is set to No Ack. Also, an MPDU corresponding to a TID not requesting an immediate response may be a QoS null frame. At this time, the ACK policy of the QoS Null frame may be No Ack. Also, a frame without a TID not requesting an immediate response may be an Action No Ack frame.

The trigger frame may include a second signaling field indicating whether channel sensing is required when the wireless communication terminal 2403 transmits the trigger-based PPDU. The base wireless communication terminal 2401 may set the value of the first signaling field based on the value of the second signaling field. Specifically, when the second signaling field is set to indicate that channel sensing for trigger-based PPDU transmission is not required, the base wireless communication terminal 2401 may set the value of the first signaling field to a predetermined value. The trigger frame may include a third signaling field indicating information on the length of the trigger-based PPDU. At this time, the base wireless communication terminal may set the value of the first signaling field based on the value of the third signaling field. Specifically, when the value of the third signaling field is less than a predetermined length, the base wireless communication terminal 2401 may set the value of the first signaling field to a predetermined value. The predetermined value is a value indicating that the A-MPDU to be transmitted to the base wireless communication terminal 2401 may not be generated by aggregating the MPDU requesting the immediate response.

The first signaling field may be the TID Aggregation Limit field described above. Also, the second signaling field may be the CS required field described above. In addition, the base wireless communication terminal 2401 may operate according to the embodiments described with reference to FIGS. 8 to 15.

The wireless communication terminal 2403 transmits the A-MPDU based on the trigger information (2403). The wireless communication terminal 2403 may determine whether to aggregate MPDUs that request an immediate response and generate an A-MPDU based on the trigger information. The trigger frame may include a signaling field indicating whether the wireless communication terminal 2403 is allowed to aggregate the MPDUs requesting an immediate response and generate an A-MPDU to be transmitted to the base wireless communication terminal 2401. The wireless communication terminal 2403 may aggregate the MPDU requesting an immediate response based on the signaling field and generate an A-MPDU to be transmitted to the base wireless communication terminal 2401. When the value of the signaling field is a predetermined value, the wireless communication terminal 2403 may generate the A-MPDU not including the MPDU requesting an immediate response. Further, when the value of the signaling field is within the predetermined range, the signaling field indicates the maximum number of TIDs that the A-MPDU is capable of having when generating the A-MPDU to be transmitted to the base wireless communication terminal 2401 by the wireless communication terminal 2403, the wireless communication terminal 2403 may generate an A-MPDU to be transmitted to the base wireless communication terminal 2401 according to the maximum number of TIDs. When the value of the signaling field is within a predetermined range, the wireless communication terminal 2403 may generate an A-MPDU by aggregating MPDUs not requesting an immediate response regardless of the maximum number of TIDs that the A-MPDU is capable of having. An MPDU not requesting an immediate response may include a Quality of Service (QoS) Null frame not requesting an ACK for data transmission. In addition, an MPDU not requesting an immediate response may include an Action No Ack frame not requesting an ACK for data transmission. In addition, an MPDU requesting an immediate response may include an action frame. In addition, when the value of the signaling field is within a predetermined range, the wireless communication terminal 2403 may generate an A-MPDU by aggregating action frames regardless of the maximum number of TIDs that the A-MPDU is capable of having. In addition, the signaling field may be the TID Aggregation Limit field described above. The above-described predetermined value may be 0. In addition, the predetermined range may be 1 or more. In addition, the wireless communication terminal 2403 may operate in the same manner as the embodiments described with reference to FIGS. 8 to 12.

When the trigger information is included in the MAC header, the wireless communication terminal 2403 may generate an A-MPDU that does not include an MPDU requesting an immediate response, as an A-MPDU to be transmitted to the base wireless communication terminal

2401. At this time, the trigger information may be included in the HE variant HT control field of the MAC header. Specifically, the trigger information may be the UL MU RS described above. In a specific embodiment, when the trigger information is included in the MAC header, the wireless communication terminal 2403 may aggregate any one frame of an ACK frame and a Block ACK (BA) frame and MPDUs not requesting an immediate response without an MPDU requesting an immediate response to generate the A-MPDU. At this time, the MPDU not requesting an immediate response may include at least one of a QoS Null frame not requesting an ACK for data transmission and an Action No Ack frame not requesting an ACK for data transmission. Specifically, the wireless communication terminal 2403 may operate as in the embodiments described with reference to FIGS. 13 to 15.

The wireless communication terminal 2403 may measure the RSSI of the PPDU including the trigger frame and determine the transmission power of the trigger-based PPDU based on the measured signal strength. Specifically, the wireless communication terminal 2403 may measure the RSSI of the legacy preamble of the PPDU transmitted on the primary channel having the bandwidth of 20 MHz as the RSSI of the PPDU. At this time, the legacy preamble indicates a preamble that may be decoded by not only the wireless communication terminal according to the embodiment of the present invention but also the legacy wireless communication terminal.

In addition, the wireless communication terminal 2403 may measure the RSSI of the PPDU in the entire frequency band in which the PPDU is transmitted. At this time, the wireless communication terminal 2403 may average the RSSI measured in the entire frequency band in which the PPDU is transmitted in units of 20 MHz. Specifically, the wireless communication terminal 2403 may measure the RSSI of the legacy preamble as the RSSI of the PPDU in the entire frequency band in which the PPDU is transmitted. The wireless communication terminal 2403 may measure the RSSI of the PPDU based on the non-legacy training field.

In addition, the wireless communication terminal 2403 may measure the RSSI of the non-legacy training field as the RSSI of the PPDU in the entire frequency band in which the PPDU is transmitted. Specifically, the wireless communication terminal 2403 may measure the RSSI of the PPDU based on a value obtained by averaging the RSSI of the non-legacy training field in units of 20 MHz bandwidth in the entire frequency band in which the PPDU is transmitted.

In addition, the wireless communication terminal 2403 may measure the RSSI of the non-legacy training field as the RSSI of the PPDU in a frequency with a 20 MHz bandwidth including a RU through which the payload of the PPDU is transmitted, which corresponds to the wireless communication terminal. When the wireless communication terminal 2403 receives the payload of the PPDU through the center 26 RU, the wireless communication terminal 2403 may measure the RSSI of the non-legacy signaling field in the frequency band in which the SIG-B content channel signaling information on the center 26 RU is transmitted. When the wireless communication terminal 2403 receives the payload of the PPDU through the center 26 RU, the wireless communication terminal 2403 may measure the RSSI of the non-legacy signaling field in a frequency band close to the SIG-B content channel that signals information on the center 26 RU among two frequency bands having a 20 MHz bandwidth including the center 26 RU. In another specific embodiment, the wireless communication terminal 2403 may measure the RSSI of the non-legacy signaling field in two frequency bands having a 20 MHz bandwidth including the center 26 RU. At this time, the wireless communication terminal 2403 may average the measured RSSI in units of 20 MHz. In another specific embodiment, it may be restricted that the base wireless communication terminal 2401 transmits trigger information through the center 26 RU. Specifically, the base wireless communication terminal 2401 may not transmit the trigger information through the center 26 RU. Specifically, the base wireless communication terminal 2401 may not transmit the trigger frame through the center 26 RU. Specifically, the wireless communication terminal 2403 and the base wireless communication terminal 2401 may operate as in the embodiments described with reference to FIGS. 16 to 23.

Although the present invention is described by using wireless LAN communication as an example, it is not limited thereto and may be applied to other communication systems such as cellular communication. Additionally, while the method, device, and system of the present invention are described in relation to specific embodiments thereof, some or all of the components or operations of the present invention may be implemented using a computer system having a general purpose hardware architecture.

The features, structures, and effects described in the above embodiments are included in at least one embodiment of the present invention and are not necessary limited to one embodiment. Furthermore, features, structures, and effects shown in each embodiment may be combined or modified in other embodiments by those skilled in the art. Therefore, it should be interpreted that contents relating to such combination and modification are included in the range of the present invention.

While the present invention is described mainly based on the above embodiments but is not limited thereto, it will be understood by those skilled in the art that various changes and modifications are made without departing from the spirit and scope of the present invention. For example, each component specifically shown in the embodiments may be modified and implemented. It should be interpreted that differences relating to such modifications and application are included in the scope of the present invention defined in the appended claims.

The invention claimed is:

1. A wireless communication terminal communicating wirelessly, the terminal comprising:
   a transceiver; and
   a processor,
   wherein the processor is configured to;
   receive trigger information from a base wireless communication terminal using the transceiver, wherein when the trigger information is a trigger frame, the trigger frame comprises a signaling field, wherein the signaling field indicates that the wireless communication terminal is not allowed to aggregate one or more MPDUs requesting an immediate response to generate an Aggregate-MAC Protocol Data Unit (A-MPDU) in response to the trigger information when a value of the signaling field is a predetermined value, and indicates a maximum number of traffic identifiers (TIDs) that is allowed to be aggregated in the A-MPDU when the value of the signaling field is within a predetermined range,
   when the value of the signaling field is the predetermined value, generate the A-MPDU not to include the one or more MPDUs requesting an immediate response, when the value of the signaling field is within the predetermined range, generate the A-MPDU according to the maximum number of TIDs, and transmit the A-MPDU to the base wireless communication terminal.

2. The wireless communication terminal of claim 1, wherein the wireless communication is allowed to aggregate one or more MPDUs not requesting an immediate response regardless of the maximum number of TIDs.

3. The wireless communication terminal of claim 2, wherein the one or more MPDUs not requesting an immediate response comprises a Quality of Service (QoS) Null frame not requesting an ACK for the QoS Null frame.

4. The wireless communication terminal of claim 2, wherein the one or more MPDUs not requesting an immediate response comprises an Action No Ack frame not requesting an ACK for the Action No Ack frame.

5. The wireless communication terminal of claim 1, wherein when the value of the signaling field is within a predetermined range, the processor is configured to include an action frame in the A-MPDU regardless of the maximum number of TIDs.

6. The wireless communication terminal of claim 1, wherein when the trigger information is included in a MAC header, the processor is configured to generate the A-MPDU not to include the one or more MPDUs requesting an immediate response.

7. The wireless communication terminal of claim 6, wherein when the trigger information is included in the MAC header, the processor is configured to aggregate any one of an ACK frame and a Block ACK (BA) frame, with one or more MPDUs not requesting an immediate response, without the one or more MPDUs requesting an immediate response to generate the A-MPDU.

8. The wireless communication terminal of claim 7, wherein the one or more MPDUs not requesting an immediate response comprises at least one of a QoS Null frame not requesting an ACK for the QoS Null frame and an Action No Ack frame not requesting an ACK for the Action No Ack frame.

9. A base wireless communication terminal communicating wirelessly, the terminal comprising: a
transceiver; and
a processor,
wherein the processor is configured to;
transmit trigger information to a plurality of wireless communication terminals using the transceiver, wherein the trigger information is a trigger frame which includes a first signaling field, wherein the first signaling field indicates that aggregating one or more MPDUs requesting an immediate response to generate the A-MPDU in response to the trigger information is not allowed when a value of the first signaling field is a predetermined value, and indicates a maximum number of traffic identifiers (TIDs) that is allowed to be aggregated in the A-MPDU when the value of the first signaling field is within a predetermined range, and receive an Aggregate-MAC Protocol Data Unit (A-MPDU) from at least one of the plurality of wireless communication terminals, wherein when a wireless communication terminal corresponding to the first signaling field is not allowed to aggregate the one or more MPDUs requesting an immediate response to generate the A-MPDU, the processor is configured to set the value of the first signaling field to the predetermined value.

10. The base wireless communication terminal of claim 9, wherein when a wireless communication terminal corresponding to the first signaling field is allowed to aggregate the one or more MPDUs requesting an immediate response to generate the A-MPDU, the processor is configured to set the value of the first signaling field according to the maximum number of TIDs.

11. The base wireless communication terminal of claim 10, wherein the maximum number of TIDs indicates a maximum number of TIDs requesting an immediate response that is allowed to be aggregated in the A-MPDU.

12. The base wireless communication terminal of claim 10, wherein one or more Quality of Service (QoS) null frames not requesting an ACK for the QoS null frames are aggregated in the A-MPDU regardless of the maximum number of TIDs.

13. The base wireless communication terminal of claim 10, wherein the trigger frame comprises a second signaling field indicating whether channel sensing is required when a wireless communication terminal transmits a response to the trigger information through trigger-based Physical Layer Protocol Data Unit (PPDU), wherein the processor is configured to set the value of the first signaling field based on the value of the second signaling field.

14. The base wireless communication terminal of claim 13, wherein when the second signaling field is set to indicate that channel sensing is not required when the wireless communication terminal transmitting the response to the trigger information transmits the trigger-based PPDU, the processor is configured to set the value of the first signaling field to the predetermined value.

15. The base wireless communication terminal of claim 13, wherein the trigger frame comprises a third signaling field indicating information on a length of the trigger-based PPDU, wherein the processor is configured to set the value of the first signaling field based on a value of the third signaling field.

* * * * *